United States Patent
Nojiri et al.

(10) Patent No.: US 12,344,162 B2
(45) Date of Patent: Jul. 1, 2025

(54) VEHICLE NOTIFICATION CONTROL DEVICE AND VEHICLE NOTIFICATION CONTROL METHOD

(71) Applicant: DENSO CORPORATION, Kariya (JP)

(72) Inventors: Shota Nojiri, Kariya (JP); Shiori Maneyama, Kariya (JP); Kazuki Izumi, Kariya (JP); Takuya Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/489,139

(22) Filed: Oct. 18, 2023

(65) Prior Publication Data

US 2024/0042927 A1 Feb. 8, 2024

Related U.S. Application Data

(63) Continuation of application No. PCT/JP2022/018612, filed on Apr. 22, 2022.

(30) Foreign Application Priority Data

Apr. 27, 2021 (JP) .................. 2021-075157
Apr. 14, 2022 (JP) .................. 2022-067145

(51) Int. Cl.
*B60Q 1/50* (2006.01)
*B60W 40/105* (2012.01)
*B60W 50/14* (2020.01)

(52) U.S. Cl.
CPC .......... *B60Q 1/543* (2022.05); *B60Q 1/5035* (2022.05); *B60Q 1/507* (2022.05); *B60W 40/105* (2013.01);
(Continued)

(58) Field of Classification Search
CPC ...... B60Q 1/543; B60Q 1/5035; B60Q 1/507; B60Q 1/26; B60Q 5/005; B60Q 1/0035;
(Continued)

(56) References Cited

U.S. PATENT DOCUMENTS

2019/0100136 A1    4/2019   Arai et al.
2020/0285044 A1*   9/2020   Noguchi ............... B60K 35/22
(Continued)

FOREIGN PATENT DOCUMENTS

JP    2017007417 A    1/2017
JP    2017178266 A   10/2017
JP    2021051687 A    4/2021

OTHER PUBLICATIONS

U.S. Appl. No. 18/489,069, filed Oct. 18, 2023, Shota Nojiri et al.
(Continued)

*Primary Examiner* — Omeed Alizada
(74) *Attorney, Agent, or Firm* — Harness, Dickey & Pierce, P.L.C.

(57) ABSTRACT

By a vehicle notification control device or a vehicle notification control method, an automated driving-related state is identified, and a vehicle exterior display is controlled. The vehicle exterior display performs, by display, vehicle exterior notification that is notification of information related to the automated driving toward an outside of a vehicle. The display of the automated driving vehicle exterior notification is changed to cause the display to become difficult to be seen, or the automated driving vehicle exterior notification is performed during the automated driving and a brightness of the caused vehicle exterior notification is lower than a brightness at a lighting time of the specific indicator lamp.

20 Claims, 19 Drawing Sheets

(52) U.S. Cl.
CPC ....... *B60W 50/14* (2013.01); *B60W 2050/143* (2013.01); *B60W 2050/146* (2013.01)

(58) Field of Classification Search
CPC .............. B60W 40/105; B60W 50/14; B60W 2050/143; B60W 2050/146; B60W 60/00; B60K 2360/171; B60K 2360/175; B60K 35/22; B60K 35/28; G08G 1/09; G08G 1/16
See application file for complete search history.

(56) References Cited

U.S. PATENT DOCUMENTS

2021/0094572 A1* 4/2021 Yamasaki ................ B60Q 1/34
2021/0094573 A1* 4/2021 Yamasaki .............. B60Q 1/507

OTHER PUBLICATIONS

U.S. Appl. No. 18/489,413, filed Oct. 18, 2023, Shota Nojiri et al.

\* cited by examiner

| INSTALLATION PLACE | VE EXTERIOR NOTIFICATION |
|---|---|
| REAR PORTION | TURN OFF LIGHT |
| NON-REAR PORTION | TURN ON LIGHT |

VEHICLE NOTIFICATION CONTROL DEVICE AND VEHICLE NOTIFICATION CONTROL METHOD

CROSS REFERENCE TO RELATED APPLICATIONS

The present application is a continuation application of International Patent Application No. PCT/JP2022/018612 filed on Apr. 22, 2022, which designated the U.S. and claims the benefit of priority from Japanese Patent Application No. 2021-075157 filed on Apr. 27, 2021 and the benefit of priority from Japanese Patent Application No. 2022-067145 filed on Apr. 14, 2022. The entire disclosures of all of the above applications are incorporated herein by reference.

TECHNICAL FIELD

The present disclosure relates to a vehicle notification control device and a vehicle notification control method.

BACKGROUND

In a technology of a comparative example, a display device is attached to a roof of a subject vehicle and displays a state of "during automated driving" while the subject vehicle performs the automated driving.

SUMMARY

By a vehicle notification control device or a vehicle notification control method, an automated driving-related state is identified, and a vehicle exterior display is controlled. The vehicle exterior display performs, by display, vehicle exterior notification that is notification of information related to the automated driving toward an outside of a vehicle. The display of the automated driving vehicle exterior notification is changed to cause the display to become difficult to be seen, or the automated driving vehicle exterior notification is performed during the automated driving and a brightness of the caused vehicle exterior notification is lower than a brightness at a lighting time of the specific indicator lamp.

DETAILED DESCRIPTION

Figure 1:
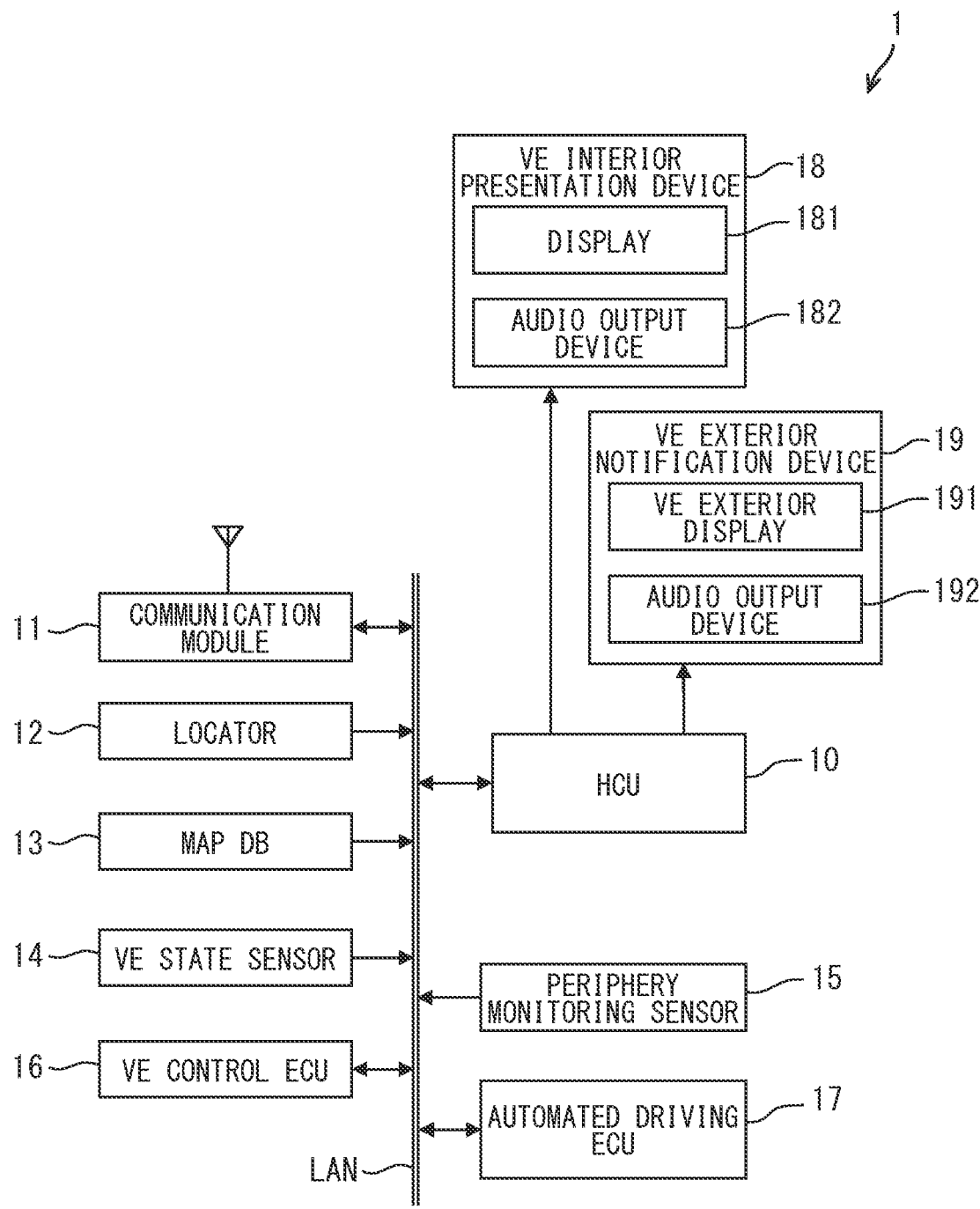
FIG. 1 is a diagram showing an example of a schematic configuration of a vehicle system.

A vehicles is provided with various lighting devices (hereinafter referred to as indicator lamps). The indicator lamps provided on a vehicle include an indicator lamp for giving information to the outside of the vehicle, such as a direction indicator, a brake lamp, and an emergency blinking indicator lamp. On the other hand, in a comparative example, it is considered only that a display device attached to a roof of a subject vehicle always displays the content of "during automated driving" during the automated driving. However, when the content of "automated driving" is always displayed during the automated driving, there is a possibility that it will be difficult for objects in the periphery to decide which one to emphasize between the display and the indicator lamp that performs notification toward the outside of the vehicle. It is also considered to notify the outside of the vehicle of the state of automated driving of the subject vehicle by display using light emission. In this case, there is a more pronounced possibility that it is difficult for the peripheral objects to understand which of the light emission and the indicator lamp should be emphasized for giving a sign to the outside of the vehicle other than the light emission.

One example of the present disclosure provides a vehicle notification control device and a vehicle notification control method that enable peripheral objects to easily understand which of display and indicator lamp should be emphasized even when performing notification indicating an automated driving state of a subject vehicle by the display toward the outside of the subject vehicle, the indicator lamp is being used for performing notification that is different from the notification using the display.

According to one example of the present disclosure, a vehicle notification control device is usable for a vehicle capable of performing automated driving. The vehicle notification control device includes: a state identification unit configured to identify an automated driving-related state that is a state of the vehicle, the state being related to the automated driving; a vehicle exterior notification controller configured to control a vehicle exterior display that performs, by display, automated driving vehicle exterior notification that is notification of information related to the automated driving toward an outside of the vehicle; and a lighting detection unit configured to detect a lighting start of a specific indicator lamp that is installed on the vehicle and performs notification different from the automated driving vehicle exterior notification. The vehicle exterior notification controller causes the automated driving vehicle exterior notification during the automated driving of the vehicle based on the automated driving-related state identified by the state identification unit, and changes the display of the automated driving vehicle exterior notification cause the display to become difficult to be seen based on detection of the lighting start of specific indicator lamp by the lighting detection unit.

According to another example of the present disclosure, a vehicle notification control method is usable for a vehicle capable of performing automated driving. The vehicle notification control method includes causing at least one processor to: identify an automated driving-related state that is a state of the vehicle, the state being related to the automated driving; control a vehicle exterior display that performs, by display, automated driving vehicle exterior notification that is notification of information related to the automated driving toward an outside of the vehicle; detect a lighting start of a specific indicator lamp that is installed on the vehicle and performs notification different from the automated driving vehicle exterior notification; cause the automated driving vehicle exterior notification during the automated driving of the vehicle based on the identified automated driving-related state; and change the display of the automated driving vehicle exterior notification to cause the display to become difficult to be seen based on detection of the lighting start of specific indicator lamp.

According to these, it is possible to change a direction of the automated driving vehicle exterior notification so that the display is difficult to be seen in response to the lighting start of the specific indicator lamp. The automated driving vehicle exterior notification is notification for information related to the automated driving and performed by the display during the automated driving of the vehicle. The specific display indicator performs notification different from the automated driving vehicle exterior notification toward the outside of the vehicle. Therefore, when the specific indicator lamp starts lighting, it is possible to make it difficult to see the automated driving vehicle exterior notification and to make it easier for the periphery to understand that the specific indicator lamp should be emphasized. On the other hand, until the specific indicator lamp starts lighting, it is possible to make it easy for the periphery to understand that the automated driving vehicle exterior notification should be emphasized by performing the vehicle exterior notification without the change causing visual recognition of the display to be difficult. As the result, the peripheral objects become possible to easily understand which of display and indicator lamp should be emphasized even when performing notification indicating an automated driving state of a subject vehicle by the display toward the outside of the subject vehicle, the indicator lamp is being used for performing notification that is different from the notification using the display.

Further, according to another example, a vehicle notification control device is usable for a vehicle capable of performing automated driving. The vehicle notification control device includes a state identification unit configured to identify an automated driving-related state that is a state of the vehicle, the state being related to the automated driving; and a vehicle exterior notification controller configured to control a vehicle exterior display that performs, by display, automated driving vehicle exterior notification that is notification of information related to the automated driving toward an outside of the vehicle. The vehicle exterior display is placed separately from a specific indicator lamp that is installed on the vehicle and performs notification different from the automated driving vehicle exterior notification. The vehicle exterior notification controller uses the automated driving-related state identified by the state identification unit to cause the automated driving vehicle exterior notification during the automated driving of the vehicle, and a brightness of the caused vehicle exterior notification is lower than a brightness of lighting of the specific indicator lamp.

Furthermore, according to another example, a vehicle notification control method is usable for a vehicle capable of performing automated driving. The vehicle notification control method includes causing at least one processor to: identify an automated driving-related state that is a state of the vehicle, the state being related to the automated driving; and control a vehicle exterior display that performs, by display, automated driving vehicle exterior notification that is notification of information related to the automated driving toward an outside of the vehicle. The vehicle exterior display is placed separately from a specific indicator lamp that is installed on the vehicle and performs notification different from the automated driving vehicle exterior notification. The processor is further caused to use the identified automated driving-related state to cause the automated driving vehicle exterior notification during the automated driving of the vehicle, and a brightness of the caused vehicle exterior notification is lower than a brightness at a lighting time of the specific indicator lamp.

According to these, it is possible to perform the automated driving vehicle exterior notification with the lower brightness than the brightness at the time of lighting the specific indicator lamp. The automated driving vehicle exterior notification is notification for information related to the automated driving and performed by the display during the automated driving of the vehicle. The specific display indicator performs notification different from the automated driving vehicle exterior notification toward the outside of the vehicle. Therefore, even when the specific indicator lamp starts lighting, it is possible to make it easier for the periphery to understand that the specific indicator lamp should be emphasized by setting the brightness of the automated driving vehicle exterior notification to be lower than that of the specific indicator lamp. As the result, the peripheral objects become possible to easily understand which of display and indicator lamp should be emphasized even when performing notification indicating an automated driving state of a subject vehicle by the display toward the outside of the subject vehicle, the indicator lamp is being used for performing notification that is different from the notification using the display.

Multiple embodiments will be described with reference to the drawings.

First Embodiment

<Schematic Configuration of Vehicle System>

The following will describe a first embodiment of the present disclosure with reference to the drawings. A vehicle system 1 shown in FIG. 1 can be used for a vehicle configured to perform automated driving (hereinafter referred to as an automated driving vehicle). In the drawings, the term of "vehicle" may be also referred to as "VE". As shown in FIG. 1, the vehicle system 1 includes an HCU (Human Machine Interface Control Unit) 10, a communication module 11, a locator 12, a map database (hereinafter referred to as map DB) 13, a vehicle state sensor 14, a periphery monitoring sensor 15, a vehicle control ECU 16, an automated driving ECU 17, a vehicle interior presentation device 18, and a vehicle exterior notification device 19. For example, the HCU 10, the communication module 11, the locator 12, the map DB 13, the vehicle state sensor 14, the periphery monitoring sensor 15, the vehicle control ECU 16, and the automated driving ECU 17 are connected to a vehicle interior LAN (see LAN in FIG. 1). Although the vehicle using the vehicle system 1 is not necessarily limited to an automobile, hereinafter, an example using the automobile will be described.

The degree of the automated driving (hereinafter, referred to as an automation level) of an automated driving vehicle includes a plurality of levels as defined by, for example, SAE (Society of Automotive Engineers). This automation level is classified into, for example, five levels including LV 0 to LV 5 as follows.

The LV 0 is a level where the driver performs all driving tasks without any intervention of the system of the vehicle. The driving task may be rephrased as a dynamic driving task. The driving tasks include, for example, steering, acceleration and deceleration, and periphery monitoring. The LV 0 corresponds to so-called manual driving. The LV 1 is a level where the system assists steering or acceleration and deceleration. The LV 1 corresponds to so-called driving assistance. The LV 2 is a level where the system assists all of the steering, the acceleration, and the deceleration. The LV 2 corresponds to so-called partial driving automation. The LVs 1 and 2 are a part of the automated driving.

For example, the automated driving at LVs 1 and 2 is automated driving in which a driver has an obligation of monitoring related to safe driving (hereinafter simply referred to as a monitoring obligation). The monitoring obligation includes visual monitoring of the periphery. The automated driving at LVs 1 and 2 is, in other words, automated driving in which a second task is not permitted. The second task is an action other than a driving operation permitted to the driver, and is a predetermined specific action. The second task is, in other words, a secondary activity, the other activity, or the like. The second task must not prevent a driver from responding to a request to take over the driving operation from the automated driving system. As an example, viewing of a content such as a video, operation of a smartphone, reading, and eating are assumed as the second task.

The LV 3 of the automated driving is a level where the system performs all driving tasks under certain conditions, and the driver performs the driving operation in an emergency situation. In the LV 3 of the automated driving, the driver must be able to respond quickly when the system requests to take over the driving operation. This takeover of the driving can also be rephrased as transfer of the monitoring obligation from the system of the vehicle to the driver. The LV 3 corresponds to a conditional driving automation. The LV 3 includes an area limit LV 3 that is limited to a specific area. The specific area referred to here may be a motorway or expressway. The specific area may be, for example, a specific lane. The LV 3 includes a specific situation limit LV 3 limited to the specific peripheral situation. An example of the specific peripheral situation is traffic congestion. Hereinafter, as the specific situation limit LV 3, a traffic congestion limit LV 3 that is limited to the traffic congestion will be described as an example. The traffic congestion limit LV 3 may be limited to traffic congestion in, for example, the automobile road, and the expressway.

The LV 4 is a LV where the system is capable of performing all driving tasks, except under a specific circumstance, such as an unsupported road, an extreme environment, and the like. The LV 4 corresponds to a high driving automation. The LV 5 of the automated driving is a level in which the system is capable of performing all driving tasks in any situation. The LV 5 corresponds to a full driving automation.

For example, the automated driving at LVs 3 to 5 is an automated driving in which the driver does not have the monitoring obligation. In other words, the automated driving corresponds to automated driving without the monitoring obligation. The automated driving at LVs 3 to 5 is, in other words, automated driving in which the second task is permitted. Among the automated driving at LVs 3 to 5, the automated driving at LV 4 or higher is automated driving in which the driver is permitted to sleep (hereinafter referred to as sleep-permitted automated driving). Among the automated driving at LVs 3 to 5, the automated driving at LV 3 or higher is automated driving in which the driver is permitted to sleep (hereinafter referred to as sleep-unpermitted automated driving).

The automated driving vehicle of the present embodiment is capable of switching the automation level. A configuration may be employable in which the automation level is switchable within a part of the LVs 0 to 5. In the present embodiment, an example will be described in which an automated driving vehicle is capable of switching between the automated driving at the LV 3, the automated driving at the LV 2 or lower, or manual driving at the LV 0.

The communication module 11 transmits and receives information to and from a center outside the subject vehicle via wireless communications. That is, wide area communication is performed. The communication module 11 receives traffic congestion information related to the periphery of the subject vehicle from the center via the wide area communication. The communication module 11 may transmit and receive information to and from other vehicles via the wireless communication. In other words, the communication module 11 may perform a vehicle-to-vehicle communication. The communication module 11 may transmit and receive information via the wireless communication with a roadside device installed on a roadside. In other words, the communication module 11 may perform a road-to-vehicle communication. When performing the road-to-vehicle communication, the communication module 11 may receive peripheral vehicle information transmitted from the vehicle positioned in the peripheral of the subject vehicle via the roadside device. Further, the communication module 11 may receive information about a peripheral vehicle transmitted from the vehicle positioned in the periphery of the subject vehicle via the center by the wide area communication.

The locator 12 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 12 combines the positioning signals received by the GNSS receiver with a measurement result of the inertial sensor to sequentially detect the position of the subject vehicle (hereinafter, subject vehicle position) on which the locator 12 is mounted. The subject vehicle position may be represented by, for example, coordinates of latitude and longitude. The subject vehicle position may be measured by using a travel distance acquired from signals sequentially output from a vehicle speed sensor mounted on the vehicle.

The map DB 13 is a non-volatile memory and stores the high-precision map data. The high-precision map data is map data with higher precision than the map data used for route guidance in a navigation function. The map DB 13 may also store map data used for route guidance. The high-precision map data includes information that can be used for the automated driving operation, such as, for example, three-dimensional road shape information, information on the number of lanes, and information indicating the traveling direction allowed for each lane. In addition, the high-precision map data may also include, for example, a node point information indicating the positions of both ends of a road marking such as a lane marking. The locator 12 may be configured without the GNSS receiver by using the three-dimensional shape information of the road. For example, the locator 12 may be configured to identify the subject vehicle position by using the three-dimensional shape information of the road and a detection result of the periphery monitoring sensor 15 such as a LiDAR (Light Detection and Ranging/Laser Imaging Detection and Ranging) that detects feature points of the road shape and the structure or a periphery monitoring camera. The term of "identify" may also mean a term of "determine". The three-dimensional shape information of the road may be generated based on a captured image by REM (Road Experience Management).

The communication module 11 may receive map data distributed from an external server through, for example, wide area communications and may store the data in the map DB 13. In this case, the map DB 13 may be a volatile memory, and the communication module 11 may sequentially acquire the map data of an area corresponding to the subject vehicle position.

The vehicle state sensor 14 is a sensor group for detecting various states of the subject vehicle. The vehicle state sensor 14 includes a vehicle speed sensor for detecting a vehicle speed, a steering sensor for detecting a steering angle, and the like. The vehicle state sensor 14 includes a steering torque sensor, an accelerator sensor, a brake sensor, and the like. The steering torque sensor detects a steering torque applied to the steering wheel. The accelerator sensor detects whether the accelerator pedal is depressed. As the accelerator sensor, an accelerator depression force sensor that detects the depression force applied to the accelerator pedal may be used. As the accelerator sensor, an accelerator stroke sensor that detects the depression amount of the accelerator pedal may be used. As the accelerator sensor, an accelerator switch that outputs a signal corresponding to whether the accelerator pedal is depressed may be used. The brake sensor detects whether the brake pedal is depressed. As the brake sensor, a brake switch that outputs a signal corresponding to whether the brake pedal is depressed may be used.

The vehicle state sensor 14 includes a direction indicator switch, a hazard switch, and the like. The direction indicator switch is a switch for detecting lighting operation of the turn lamp, which is a direction indicator. The direction indicator switch can also be called a turn signal switch or a blinker switch. The turn lamp can also be called a turn signal lamp or a blinker lamp. The hazard switch is a switch for detecting lighting operation of the hazard lamp, which is an emergency blinking indicator lamp. The lighting of the hazard lamps corresponds to the lighting of all turn lamps of the subject vehicle. The vehicle state sensor 14 outputs detected sensing information to the vehicle interior LAN. Note that the sensing information detected by the vehicle state sensor 14 may be output to the vehicle interior LAN via an ECU mounted on the subject vehicle.

The periphery monitoring sensor 15 monitors a peripheral environment of the subject vehicle. For example, the periphery monitoring sensor 15 detects an obstacle around the subject vehicle, such as a pedestrian, a moving object like the other vehicle, and a stationary object, and an object on the road. The periphery monitoring sensor 15 further detects a road surface marking such as a traffic lane marking around the subject vehicle. The periphery monitoring sensor 15 is, for example, a sensor such as a periphery monitoring camera that captures a predetermined range in the periphery of the subject vehicle, a millimeter wave radar that transmits a search wave in a predetermined range around the subject vehicle, a sonar, or a LiDAR. The periphery monitoring camera sequentially outputs, as sensing information, sequentially captured images to the automated driving ECU 17. A sensor that transmits a probe wave such as a sonar, a millimeter wave radar, a LiDAR or the like sequentially outputs, as the sensing information to the automated driving ECU 17, a scanning result based on a received signal acquired as a wave reflected on an obstacle on the road. The sensing information detected by the periphery monitoring sensor 15 may be outputted to the vehicle interior LAN via the automated driving ECU 17.

The vehicle control ECU 16 is an electronic control unit configured to perform a traveling control of the subject vehicle. The traveling control includes an acceleration and deceleration control and/or a steering control. The vehicle control ECU 16 includes a steering ECU that performs the steering control, a power unit control ECU and a brake ECU that perform the acceleration and deceleration control, and the like. The vehicle control ECU 16 is configured to output a control signal to a traveling control device such as an electronic throttle, a brake actuator, and an EPS (Electric Power Steering) motor mounted on the subject vehicle thereby to perform the traveling control.

The automated driving ECU 17 includes, for example, a processor, a memory, an I/O, and a bus that connects those devices, and executes a control program stored in the memory thereby to execute a process related to the autonomous driving operation. The memory referred to here is a non-transitory tangible storage medium, and stores programs and data that can be read by a computer. The non-transitory tangible storage medium may be provided by a semiconductor memory, a magnetic disk, or the like. The automated driving ECU 17 includes, as functional blocks, a traveling environment recognition unit, a behavior determination unit, and a control execution unit.

The traveling environment recognition unit recognizes a traveling environment in the periphery of the subject vehicle based on the sensing information acquired from the periphery monitoring sensor 15. The traveling environment recognition unit recognizes the traveling environment in the periphery of the subject vehicle based on, in addition to the sensing information, which is acquired from the periphery monitoring sensor 15, the subject vehicle position, which is acquired from the locator 12, the map data, which is acquired from the map DB 13 and the like. As an example, the traveling environment recognition unit uses these pieces of information to generate a virtual space that reproduces an actual driving environment.

The traveling environment recognition unit may determine a manual driving area (hereinafter referred to as an MD area) in a travelling area of the subject vehicle. The traveling environment recognition unit may determine an automated driving area (hereinafter referred to as an AD area) in the travelling area of the subject vehicle. The traveling environment recognition unit may also discriminate between an ST section and a non-ST section, which will be described later, in the AD area.

The MD area is an area where the automated driving is prohibited. In other words, the MD area is an area where the driver performs all of the longitudinal control, the lateral control and the peripheral monitoring of the subject vehicle. The longitudinal direction is a direction that coincides with a front-rear direction of the subject vehicle. The lateral direction is a direction that coincides with a right-left direction of the subject vehicle. The longitudinal direction control corresponds to acceleration-deceleration control of the subject vehicle. The lateral direction control corresponds to steering control of the subject vehicle. For example, the MD area may be a general road.

The AD area is an area where the automated driving is permitted. In other words, the AD area is an area where a system in the subject vehicle is capable of performing at least one of the longitudinal control, the lateral control, or the periphery monitoring, instead of the driver. For example, the AD area may be the expressway or the automobile road. The automated driving at the traffic congestion limit LV 3 (hereinafter referred to as traffic congestion limit automated driving) may be configured, for example, to be permitted only during the traffic congestion in the AD area.

The AD area is divided into an ST section and a non-ST section. The ST section is a section in which the automated driving at the area limit LV 3 (hereinafter referred to as area limit automated driving) is permitted. The area limit automated driving may be configured to be permitted only in specific lanes in the ST section. The non-ST section is a section in which the automated driving at LV 2 or lower is possible. In the present embodiment, it is assumed that the non-ST section, in which the automated driving at LV 1 is permitted, and the non-ST section, in which the automated driving at LV 2 is permitted, are not classified. The ST section may be, for example, a traveling section in which a high-precision map date is prepared. The non-ST section may be set to a section that does not correspond to the ST section in the AD area.

The behavior determination unit switches the control subject of driving operation control between the driver and the vehicle system of the subject vehicle. The behavior determination unit determines a traveling plan to travel the subject vehicle based on the recognition result of the traveling environment by the traveling environment recognition unit when the system has a right to control the driving operation. As the traveling plan, it is sufficient to determine the route to the destination and the behavior that enables the subject vehicle to reach the destination. Examples of the behavior include going straight, turning right, turning left, changing lanes, and the like.

In addition, the behavior determination unit switches the automation level of automated driving of the subject vehicle as necessary. The behavior determination unit determines whether the automation level can be increased. For example, the switching from the manual driving to the automated driving at LV 2 or lower may be determined to be possible, when the subject vehicle moves from the MD area to the non-ST section in the AD area. The switching from the manual driving at LV 0 to the automated driving at the area limit LV 3 may be determined to be possible, when the subject vehicle moves from the MD area to the ST section in the AD area. When the subject vehicle moves from the non-ST section to the ST section in the AD area, it may be determined that the automated driving at LV 2 or lower can be switched to the automated driving at LV 3. When the subject vehicle is located in the AD area, the automation level is LV 2 or lower, and all the conditions for the traffic congestion limit LV 3 are satisfied, it may be determined that switching from the automated driving at LV 2 or lower to the traffic congestion limit LV 3 is possible.

The behavior determination unit may decrease the automation level when determining that the automation level needs to be decreased. Cases where it is determined that the automation level needs to be lowered include the time of override detection, the time of planned driving change, and the time of unplanned driving change. The override is an operation for the driver of the subject vehicle to voluntarily acquire the control right of the subject vehicle. In other words, the override is an operational intervention by the driver of the vehicle. The behavior determination unit may detect the override operation from sensing information obtained from the vehicle state sensor 14. For example, the behavior determination unit may detect the override operation when the steering torque detected by the steering torque sensor exceeds a threshold. Also, the behavior determination unit may detect the override operation when the accelerator sensor detects depression of the accelerator pedal. In addition, the behavior determination unit may detect the override operation when the brake sensor detects depression of the brake pedal.

A scheduled driving change is a scheduled driving change determined by the system. For example, the scheduled driver change is performed when the subject vehicle moves from the ST section of the AD area to the non-ST section or the MD area. In this case, the automation level drops from the area limit LV 3 to LV 2 or lower. The scheduled driver change may be performed when the subject vehicle moves from the non-ST section of the AD area to the MD area. In this case, the automation level drops from the area limit LV 3 to LV 0. The unscheduled driving change is an unscheduled sudden driving change determined by the system. For example, the unscheduled driver change is performed when the conditions of traffic congestion limit LV 3 are no longer satisfied during the automated driving of traffic congestion limit LV 3. In this case, the automation level drops from the traffic congestion limit LV 3 to LV 2 or lower. A plurality of types of conditions may be used as the conditions for the traffic congestion limit LV 3. Example of the conditions may be that the vehicle is within the AD area, that the vehicle speed of the preceding vehicle or the subject vehicle is equal to or less than a threshold for estimating the traffic congestion, and that the vehicle is in the traffic congestion section according to the traffic congestion information. The unscheduled driver change may be performed when the automation level cannot be maintained due to a failure in the recognition of the traveling environment by the traveling environment recognition unit.

When the automation level is lowered by the override, the automated driving ECU 17 lowers the automation level after an auxiliary period in which the system of the subject vehicle performs more driving assistance than that at the lowered automation level. The degree of the traveling assistance during the auxiliary period may be, for example, less than that at the automation level that is not lowered, but greater than that at the lowered automation level. Further, when the automation level is lowered due to the driving change determined by the system of the subject vehicle, the automated driving ECU 17 makes a driving change request to the driver of the subject vehicle and then lowers the automation level. The driver change request is presented to the driver by the vehicle interior presentation device 18, which will be described later. When receiving the driving change request, the driver takes a preparatory action necessary for lowering the automation level, such as gripping the steering wheel. After confirming that this preparation action has been taken, the automated driving ECU 17 lowers the automation level. When the preparatory action is not performed, measures such as evacuating to the road shoulder and stopping the vehicle may be taken.

The vehicle interior presentation device 18 presents information to the interior of the subject vehicle. The vehicle interior presentation device 18 has a display 181 and an audio output device 182. The display 181 presents information by displaying information. The display 181 presents information according to instructions from the HCU 10. As the display 181, for example, a meter MID (Multi Information Display), CID (Center Information Display), HUD (Head-Up Display) can be used.

The meter MID is a display device provided in front of the driver's seat in the vehicle compartment. As an example, the meter MID may be arranged on the meter panel. The CID is a display device placed in a center of an instrument panel of the subject vehicle. The HUD is provided, for example, on an instrument panel inside the vehicle. The HUD projects a display image formed by an projector onto a predetermined projection area on a front windshield as a projection member. A light of the display image reflected by the front windshield to an inside of a vehicle compartment is perceived by the driver seated in the driver's seat. As a result, the driver can visually recognize a virtual image of the display image formed in front of the front windshield which is superimposed on a part of the foreground landscape. The HUD may be configured to project the display image onto a combiner provided in front of the driver's seat instead of the front windshield.

The audio output device 182 presents information by outputting audio. As the audio output device 182, a speaker or the like provided in the vehicle interior of the subject vehicle can be used.

The vehicle exterior notification device 19 performs vehicle exterior notification (hereinafter, automated driving vehicle exterior notification), which is notification of information related to the automated driving, to the outside of the subject vehicle. The vehicle exterior notification device 19 has a vehicle exterior display 191 and an audio output device 192. The vehicle exterior display 191 is installed on the vehicle exterior of the subject vehicle and performs display toward the exterior of the subject vehicle. The vehicle exterior display 191 may be configured to perform notification by emitting light from a lamp. Hereinafter, a case where the vehicle exterior display 191 is the lamp will be described as an example. The vehicle exterior display 191 may be a display that shows a text, an image, and the like.

For example, an LED lamp may be used as the vehicle exterior display 191. It is preferable that the vehicle exterior display 191 is capable of changing various notification modes. The mode of notification corresponds to the mode using light emission when the notification is performed by the light emission. For example, it is preferable that the vehicle exterior display 191 is capable of switching lighting color in addition to switching between an on-state and an off-state of the lighting. The switching of the lighting color may be implemented by changing the lighting combination of the LEDs of a plurality of colors. The vehicle exterior display 191 may be capable of blinking. The vehicle exterior display 191 may be capable of changing the blinking cycle. The vehicle exterior display 191 may be capable of changing a ratio between the on-state time and the off-state time of the light.

Figure 2:
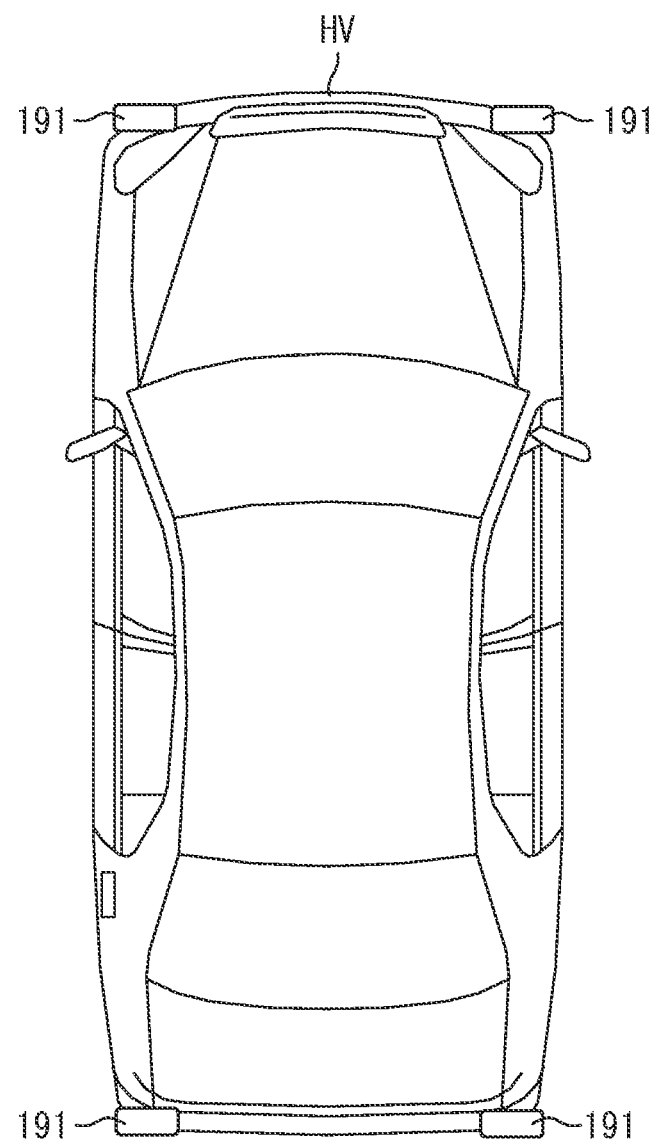
FIG. 2 is a diagram for illustrating an installation example of a vehicle exterior display.

As shown in FIG. 2, it is preferable that the LED lamps as the vehicle exterior displays 191 are provided at four corners of the subject vehicle. This is because the vehicle exterior displays 191 can be easily confirmed from any direction in the periphery of the subject vehicle. For example, the vehicle exterior displays 191 may be provided at the left and right corner portions of a front bumper and the left and right corner portions of a rear bumper, respectively. In FIG. 2, the HV indicates the subject vehicle.

Figure 3:
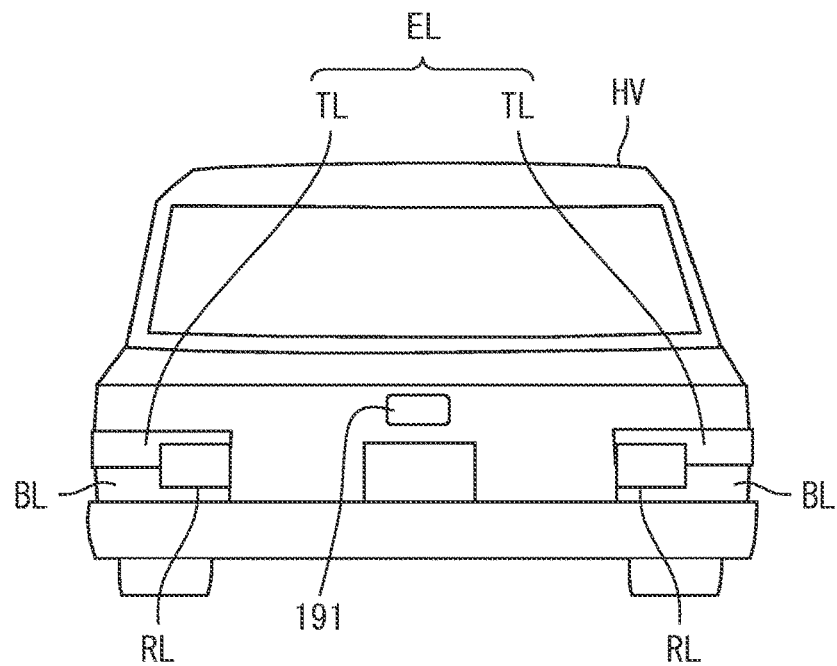
FIG. 3 is a diagram for illustrating an installation example of the vehicle exterior display.

As shown in FIG. 3, one LED lamp serving as the vehicle exterior display 191 may be provided in the vicinity of the central portion in the vehicle width direction of the rear portion of the vehicle. According to this, at least, the vehicle, which follows the subject vehicle and is most affected by the behavior of the subject vehicle, can easily check the vehicle exterior display 191.

In addition, FIG. 3 shows an example of an indicator lamp for performing notification towards the outside of the subject vehicle, and the indicator lamp is different from the vehicle exterior display 191. The notification here can also be rephrased as a signal (or sign) that conveys the intention of the action of the subject vehicle. BL in FIG. 3 indicates a brake lamp. The brake lamp can also be rephrased as a brake light. In FIG. 3, which is a view from the rear of the subject vehicle, brake lamps are provided on the left and right portion of the rear of the subject vehicle. TL in FIG. 3 indicates the turn lamp. In FIG. 3, turn lamps are provided on the left and right portions of the rear of the subject vehicle. EL in FIG. 3 indicates the hazard lamp. The hazard lamp can also be rephrased as hazard light and an emergency blinking indicator lamp. The hazard lamp is implemented by the turn lamp of all vehicles, as described above. RL in FIG. 3 indicates the back lamp. The back lamp can also be rephrased as back light, reverse light, or a reverse lamp. In FIG. 3, the back lamps are provided on the left and right portion of the rear of the subject vehicle. Note that one back lamp may be provided in the vicinity of the central portion in the vehicle width direction of the rear portion of the vehicle. The same applies to members using the same symbols in subsequent figures.

The arrangement of the indicator lamps shown in FIG. 3 is merely an example. The arrangement of the indicator lamps may be other than the arrangement shown in FIG. 3. Note that there is an indicator lamp (hereinafter referred to as a non-notification indicator lamp) other than indicator lamp (hereinafter referred to as a notification indicator lamp) for providing notification to the outside of the subject vehicle. Examples of the non-notification indicator lamp include a width lamp, a tail lamp, a license plate lamp, a back fog light, and the like.

Figure 4:
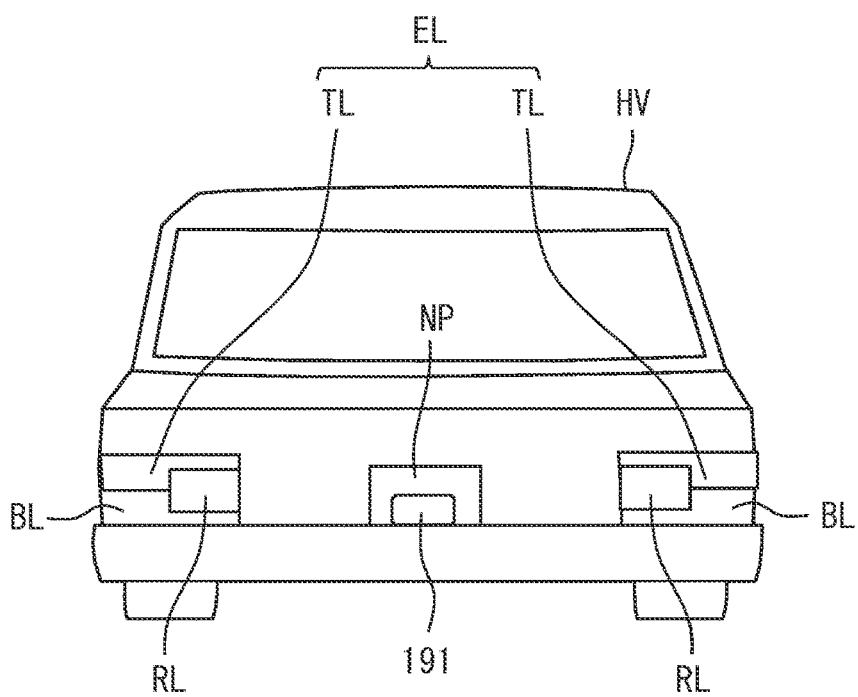
FIG. 4 is a diagram for illustrating an installation example of the vehicle exterior display.

As shown in FIG. 4, the vehicle exterior display 191 may be provided at a position where the license plate (also referred to as a number plate) of the subject vehicle is provided. According to this, since the license plate is provided at a position that can be easily seen from the periphery of the subject vehicle, the vehicle exterior display 191 can also be easily seen from the periphery of the subject vehicle. NP in FIG. 4 indicates the license plate. For example, an LED lamp may be used as the vehicle exterior display 191. The vehicle exterior display 191 may be provided integrally with the license plate. The vehicle exterior display 191 may be provided separately from the license plate at a position where the license plate is provided.

Figure 5:
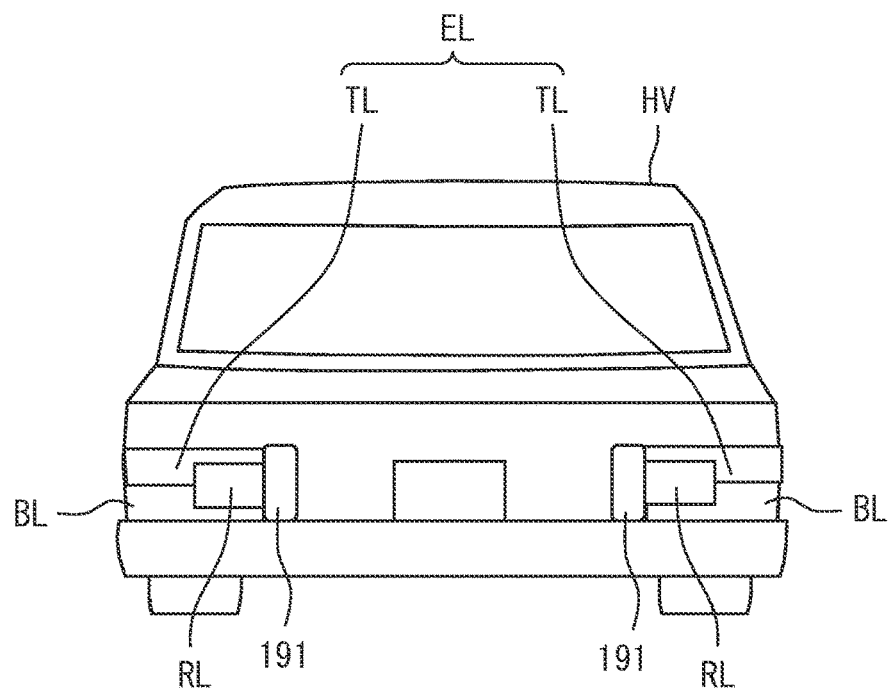
FIG. 5 is a diagram for illustrating an installation example of the vehicle exterior display.

As shown in FIG. 5, the vehicle exterior display 191 may be provided at a position in contact with at least one of the brake lamp BL or the turn lamp TL of the subject vehicle. According to this, since the vehicle exterior display 191 and the brake lamp BL and/or the turn lamp TL are positioned close to each other, it is easy to collectively arrange these wirings. Therefore, it is possible to simplify the wiring arrangement of the vehicle exterior display 191 and the brake lamp BL and/or the turn lamp TL. For example, an LED lamp may be used as the vehicle exterior display 191. Although the example of FIG. 5 shows an example in which a plurality of vehicle exterior displays 191 are provided, the present disclosure is not necessarily limited to this. The vehicle exterior display 191 may be configured to be provided on one subject vehicle. Moreover, although the example of FIG. 5 shows an example in which the vehicle exterior displays 191 are provided at positions in contact with both the brake lamp BL and the turn lamp TL, the present disclosure is not necessarily limited to this. For example, the vehicle exterior display 191 may be provided at a position in contact with only one of the brake lamp BL and the turn lamp TL. Even in this case, since the brake lamp BL and the turn lamp TL are provided close to each other, it is possible to simplify the wiring arrangement of the vehicle exterior display 191 and the brake lamp BL and the turn lamp TL.

Figure 6:
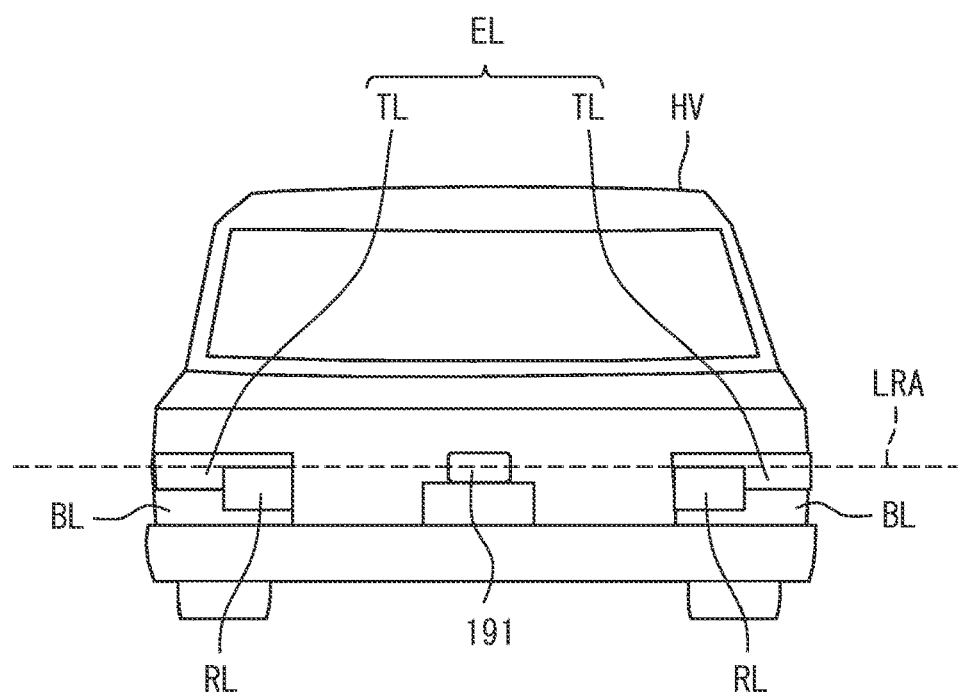
FIG. 6 is a diagram for illustrating an installation example of the vehicle exterior display.

As shown in FIG. 6, the vehicle exterior display 191 may be positioned on the rear surface of the subject vehicle along a left-right axis of the subject vehicle (see LRA in FIG. 6). The left-right axis passes through at least one of the brake lamp BL or the turn lamp TL. According to this, since the vehicle exterior display 191 and the brake lamp BL and/or the turn lamp TL are arranged in the left-right direction in the same plane of the subject vehicle, it is easy to collectively arrange these wirings. Therefore, it is possible to simplify the wiring arrangement of the vehicle exterior display 191 and the brake lamp BL and/or the turn lamp TL. For example, an LED lamp may be used as the vehicle exterior display 191. Although the example of FIG. 6 shows an example in which the vehicle exterior display 191 is provided on the rear surface of the subject vehicle, the present disclosure is not necessarily limited to this. The vehicle exterior display 191 may be provided on the front surface of the subject vehicle, or may be provided on the front and rear surfaces of the subject vehicle. Also, although in the example of FIG. 6, the axis LRA passing through only the turn lamp TL between the brake lamp BL and the turn lamp TL is shown, the present disclosure is not necessarily limited to this. Of the brake lamp BL and the turn lamp TL, the axis LRA may pass through only the brake lamp BL. Alternatively, when there is an area in which the brake lamps BL and the turn lamps TL are aligned in the lateral direction of the subject vehicle, the axis LRA may pass through both the brake lamps BL and the turn lamps TL.

Figure 7:
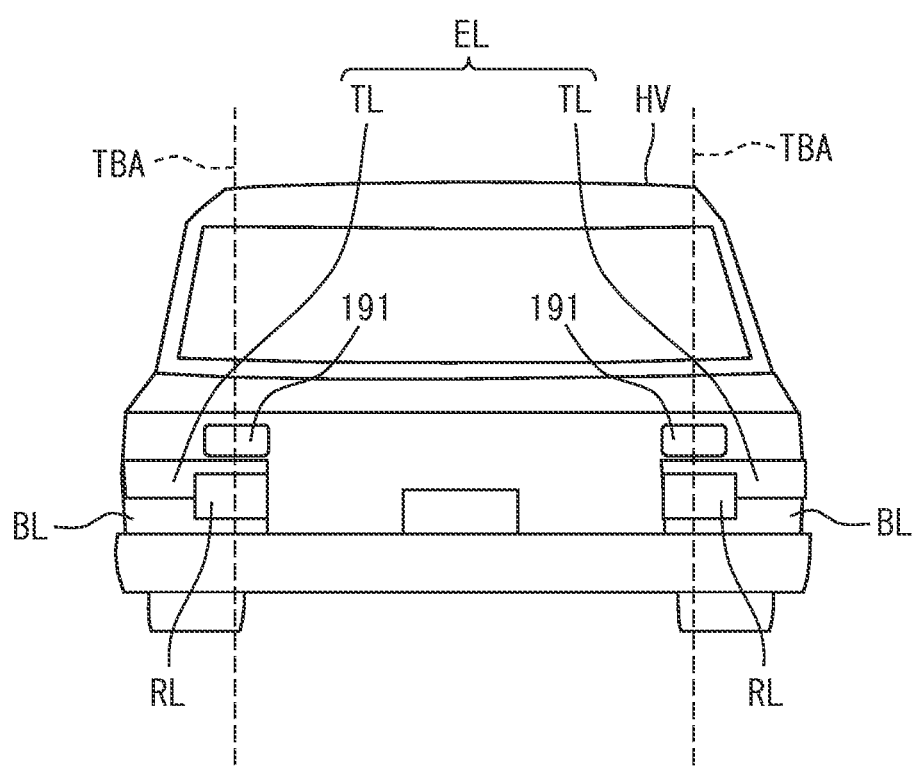
FIG. 7 is a diagram for illustrating an installation example of the vehicle exterior display.

As shown in FIG. 7, the vehicle exterior displays 191 may be positioned along the vertical axis (see TBA in FIG. 7) of the subject vehicle, and the vertical axis may pass through at least one of the brake lamp BL or the turn lamp TL on the rear surface of the subject vehicle. According to this, since the vehicle exterior display 191 and the brake lamp BL and/or the turn lamp TL are arranged in the vertical direction in the same plane of the subject vehicle, it is easy to collectively arrange these wirings. Therefore, it is possible to simplify the wiring arrangement of the vehicle exterior display 191 and the brake lamp BL and/or the turn lamp TL. For example, an LED lamp may be used as the vehicle exterior display 191. Although the example of FIG. 7 shows an example in which the plurality of vehicle exterior displays 191 are provided on the rear surface of the subject vehicle, the present disclosure is not necessarily this. The vehicle exterior display 191 may be provided on the rear surface of the subject vehicle. Moreover, although the example of FIG. 7 shows an example in which the vehicle exterior displays 191 are provided on the rear surface of the subject vehicle, the present disclosure is not necessarily limited to this. The vehicle exterior display 191 may be provided on the front surface of the subject vehicle, or may be provided on the front and rear surfaces of the subject vehicle. Although the example of FIG. 7 shows the axis TBA passing through both the brake lamp BL and the turn lamp TL, the present disclosure is not necessarily this. Of the brake lamp BL and the turn lamp TL, the axis TBA may be an axis passing through only the brake lamp BL. Alternatively, the axis TBA may pass through only the turn lamp TL of the brake lamp BL and the turn lamp TL.

The audio output device 192 presents information by outputting audio. As the audio output device 192, a speaker or the like provided on the vehicle exterior of the subject vehicle can be used.

The HCU 10 mainly includes a computer including a processor, a volatile memory, a nonvolatile memory, an I/O, and a bus connecting these devices. The HCU 10 is connected to the vehicle interior presentation device 18 and the vehicle exterior notification device 19. The HCU 10 executes processes related to control of the vehicle interior presentation device 18 and the vehicle exterior notification device 19 by executing a control program stored in the non-volatile memory. This HCU 10 corresponds to a vehicle notification control device. The configuration of the HCU 10 will be described in detail below. Execution of a process of each functional block of the HCU 10 by the computer corresponds to execution of a vehicle notification control method.

<Schematic Configuration of HCU>

Figure 8:
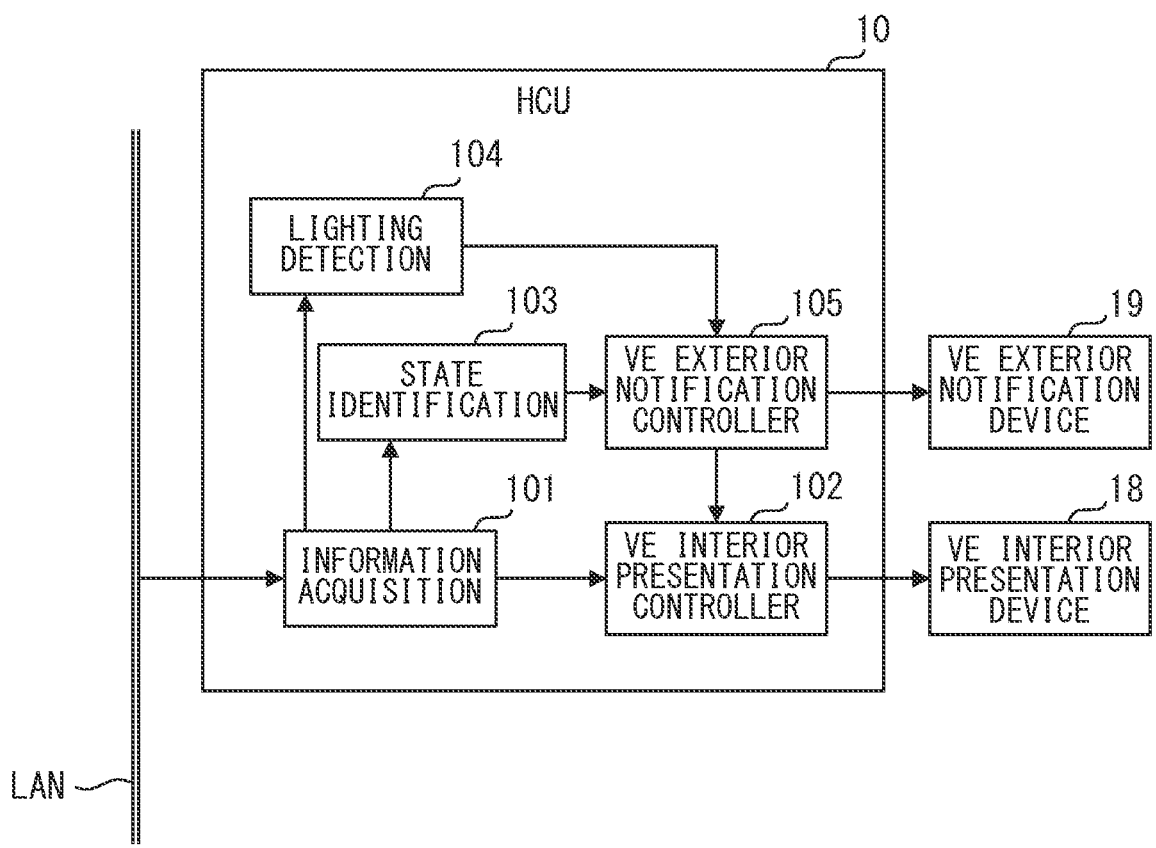
FIG. 8 is a diagram showing an example of a configuration of an HCU.

Next, a schematic configuration of the HCU 10 will be described with reference to FIG. 8. As shown in FIG. 8, the HCU 10 includes an information acquisition unit 101, a vehicle interior presentation controller 102, a state identification unit 103, a lighting detection unit 104, and a vehicle exterior notification controller 105 as functional blocks regarding the control of the vehicle interior presentation device 18 and the vehicle exterior notification device 19. Some or all of the functions executed by the HCU 10 may be implemented in hardware manner using one or more ICs or the like. Alternatively, some or all of the functions executed by the HCU 10 may be implemented by a combination of execution of software by a processor and a hardware device.

The information acquisition unit 101 acquires information input from the outside of the HCU 10. The information acquisition unit 101 acquires the recognition result of the traveling environment recognition unit of the automated driving ECU 17, for example. The information acquisition unit 101 acquires the determination result of the behavior determination unit of the automated driving ECU 17. The information acquisition unit 101 acquires sensing information detected by the vehicle state sensor 14.

The vehicle interior presentation controller 102 controls the vehicle interior presentation device 18. The vehicle interior presentation controller 102 causes the display 181 to display an image showing a foreground of the subject vehicle (hereinafter referred to as a foreground image). The vehicle interior presentation controller 102 may display the foreground image on the display 181 using the recognition result of the traveling environment recognition unit acquired by the information acquisition unit 101. For example, the foreground image may be a bird's-eye view viewed from a virtual viewpoint above the subject vehicle.

Figure 9:
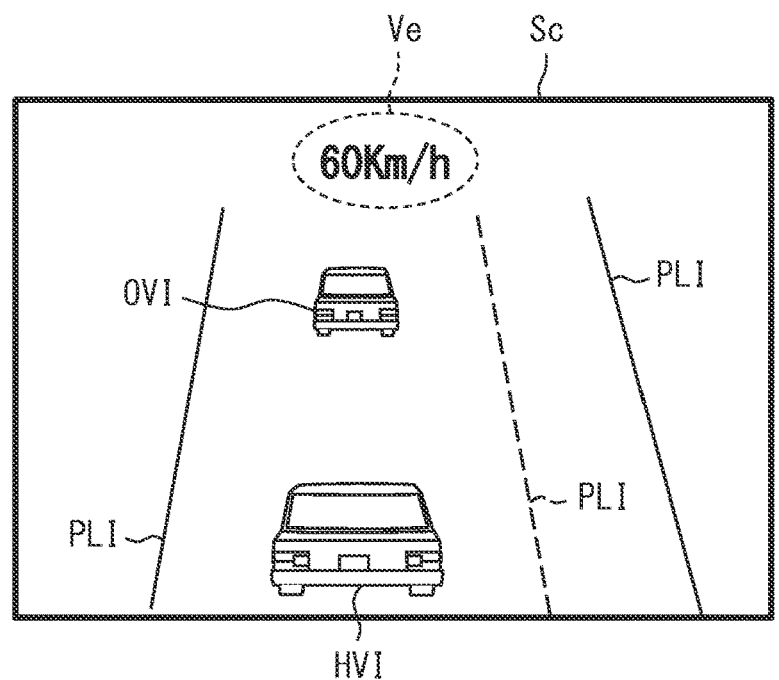
FIG. 9 is a diagram for illustrating an example of a foreground image displayed on a display.

An example of the foreground image will be described with reference to FIG. 9. Sc in FIG. 9 shows a display screen of the display 181. HVI in FIG. 9 shows an image representing the subject vehicle (hereinafter referred to as the subject vehicle image). OVI in FIG. 9 shows an image representing a peripheral vehicle of the subject vehicle (hereinafter referred to as a peripheral vehicle image). PLI in FIG. 9 shows an image representing a lane marking (hereinafter referred to as a lane marking image). VI in FIG. 9 shows an image representing a vehicle speed of the subject vehicle (hereinafter referred to as a subject vehicle speed image). As the foreground image, as shown in FIG. 9, a subject vehicle image, a peripheral vehicle image, the lane marking image, and a subject vehicle speed image may be displayed. In the foreground image, the subject vehicle image and the surrounding vehicle image that simulate an actual positional relationship between the subject vehicle and the peripheral vehicle may be displayed.

The state identification unit 103 identifies a state (hereinafter referred to as automated driving-related state) of the subject vehicle related to automated driving. The process of the state identification unit 103 corresponds to a state identification process. The state identification unit 103 may identify the automated driving-related state based on the information obtained by the information acquisition unit 101, such as the result of recognition by the traveling environment recognition unit and the result of determination by the behavior determination unit. The state identification unit 103 may identify the current automation level as the automated driving-related state. The state identification unit 103 may identify the current automation level by monitoring the automated driving ECU 17. The state identification unit 103 may identify whether the automation level increases or decreases as the automated driving-related state. Whether the automation level increases or decreases may be identified from the determination result of the behavior determination unit. For example, the state identification unit 103 may distinguish between area limit automated driving and traffic congestion limit automated driving for identification of the automated driving-related state. By monitoring the automated driving ECU 17, the state identification unit 103 may identify whether the area limit automated driving or the traffic congestion limit automated driving is in progress.

The lighting detection unit 104 detects the start of lighting of a specific indicator lamp that is provided in the subject vehicle and is used to provide notification to the outside of the subject vehicle, and the notification is different from the automated driving vehicle exterior notification. The process by the lighting detection unit 104 corresponds to a lighting detection process. The specific indicator lamp may be, for example, at least one of the brake lamp BL, the turn lamp TL, or the hazard lamp EL. In the example of the present embodiment, the specific indicator lamps are the brake lamp BL, the turn lamp TL, and the hazard lamp EL. The lighting detection unit 104 may detect the start of lighting of the specific indicator lamp from the sensing result of the vehicle state sensor 14 acquired by the information acquisition unit 101. For the brake lamp BL, the lighting detection unit 104 may detect the start of lighting from the signal of the brake switch. For the brake lamp BL, the lighting detection unit 104 may detect the start of lighting from the signal of the brake switch. For the turn lamp TL, the lighting detection unit 104 may detect the start of lighting from the signal of the direction instruction switch. The lighting detection unit 104 may detect the start of lighting of the hazard lamp EL from the signal of the hazard switch.

The vehicle exterior notification controller 105 controls the vehicle exterior notification device 19 to perform the automated driving vehicle exterior notification. That is, the vehicle exterior notification controller 105 controls the vehicle exterior display 191 to perform the vehicle exterior notification. The process by the vehicle exterior notification controller 105 corresponds to a vehicle exterior notification control process. The vehicle exterior notification controller 105 may cause the automated driving exterior notification from the audio output device 192, or may not cause the automated driving exterior notification from the audio output device 192. In the following, the automated driving vehicle exterior notification from the vehicle exterior display 191 will be described.

The vehicle interior presentation controller 102 controls the vehicle interior presentation device 18 to perform a notification (hereinafter referred to as vehicle interior notification) toward the interior of the subject vehicle. The vehicle interior notification indicates that the automated driving vehicle exterior notification is being performed. Therefore, the vehicle interior presentation device 18 corresponds to a vehicle interior notification device, and the vehicle interior presentation controller 102 corresponds to a vehicle interior notification controller.

Figure 10:
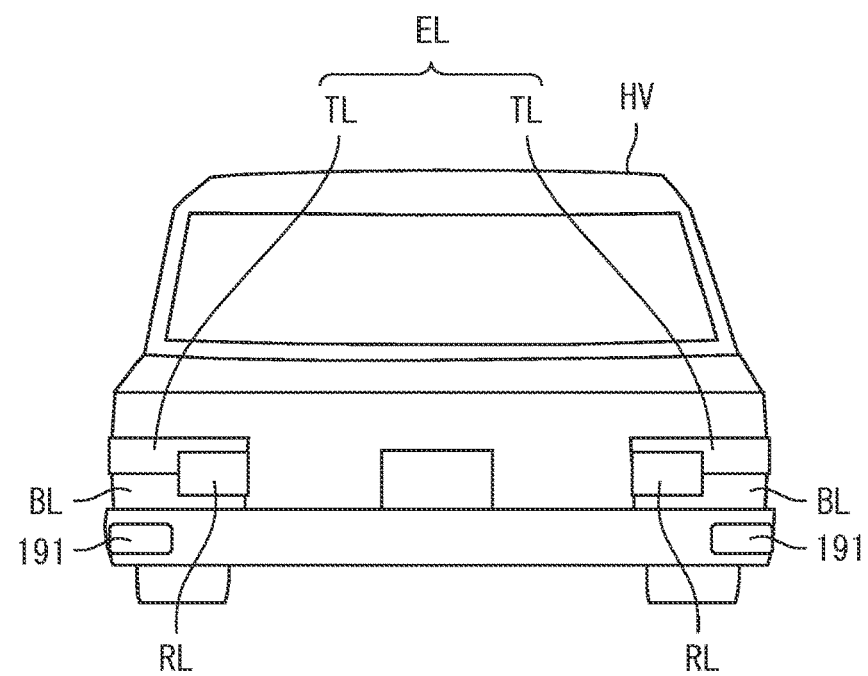
FIG. 10 is a diagram showing an example of an appearance of a subject vehicle.
Figure 11:
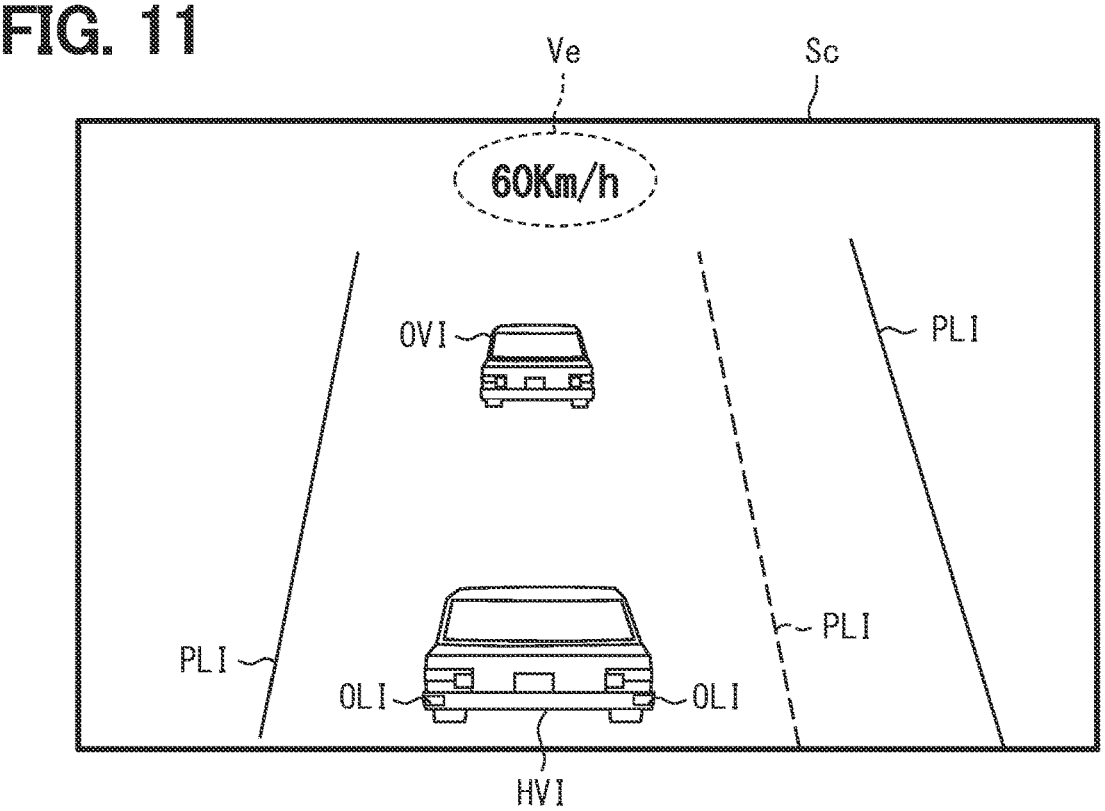
FIG. 11 is a diagram showing an example of the vehicle interior notification in the foreground image.

As shown in FIG. 11, the vehicle interior presentation controller 102 may perform the vehicle interior notification by displaying, in the subject vehicle image displayed by the display 181, the similar information to the automated driving vehicle exterior notification in an area (see FIG. 11) where the automated driving vehicle exterior notification is performed using the vehicle exterior display 191. FIG. 10 is a diagram showing an appearance of the actual subject vehicle. FIG. 11 is a diagram showing an example of the vehicle interior notification in the foreground image described with reference to FIG. 9. FIG. 10 shows the appearance of the subject vehicle when viewed from behind. FIG. 10 shows an example in which the vehicle exterior displays 191 are provided at the four corner portions of the subject vehicle. The example of FIG. 10 shows the vehicle exterior displays 191 provided at the left and right corners of the rear part of the subject vehicle. OLI in FIG. 11 indicates an image (hereinafter referred to as an vehicle exterior notification lamp image) showing the vehicle exterior display 191 in the subject vehicle image.

Figure 12:
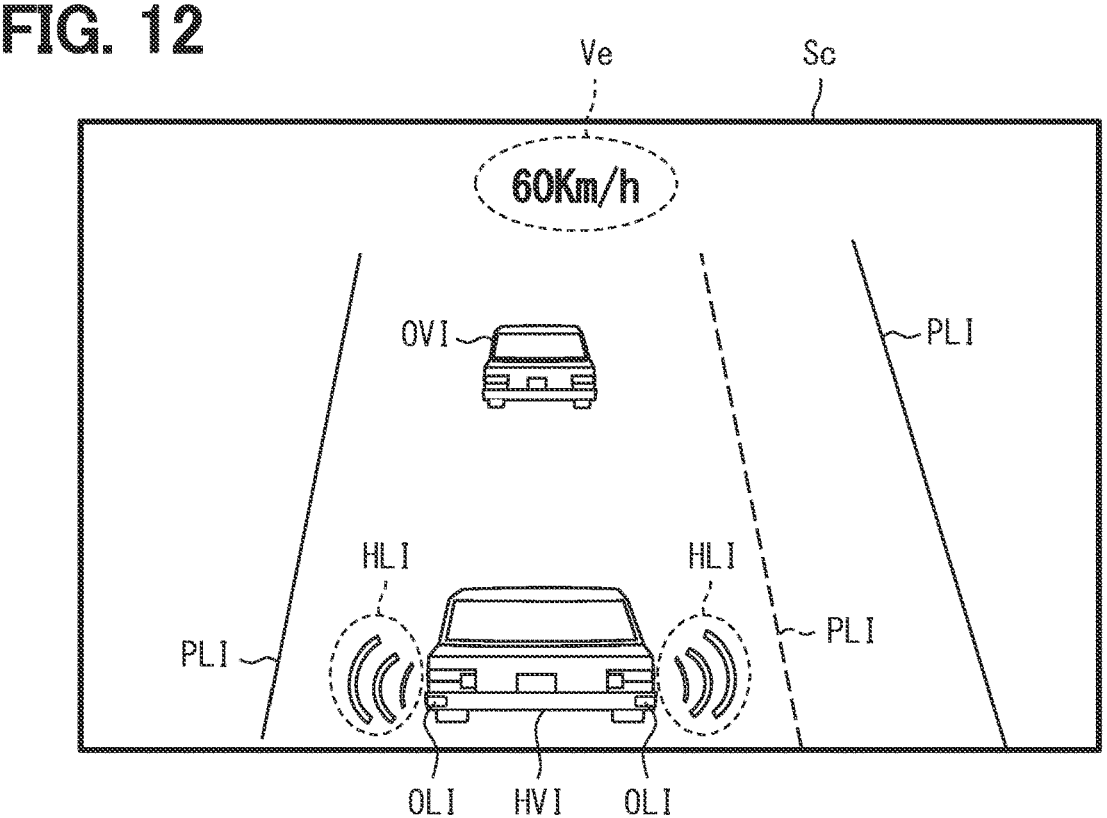
FIG. 12 is a diagram showing an example of the vehicle interior notification in the foreground image.

In addition, when the vehicle interior notification indicating that the automated driving vehicle exterior notification is being performed is performed using the subject vehicle image, as shown in FIG. 12, an image (see HLI in FIG. 12)

for highlighting the vehicle exterior notification lamp image may be displayed in the periphery of the subject vehicle. According to this, even when it is difficult for the driver to understand that the automated driving vehicle exterior notification is being performed only with the vehicle exterior notification lamp image, it becomes easy for the driver to understand that the automated driving vehicle exterior notification is being performed.

The vehicle interior presentation controller 102 may cause the vehicle interior notification in cooperation with the vehicle exterior notification controller 105 causing the automated driving vehicle exterior notification. For example, the vehicle interior presentation controller 102 may cause the vehicle interior notification at the same timing when the vehicle exterior notification controller 105 causes the automated driving vehicle exterior notification. In an example of a case where an LED lamp is used as the vehicle exterior display 191, the vehicle exterior notification lamp image in the foreground image may be turned on at the same timing as the lighting of the LED lamp. For example, the automated driving vehicle exterior notification indicating that the automation level has changed and the vehicle interior notification indicating that the automation level has changed may be performed at the same timing. According to this, it becomes possible for the driver to know the timing at which the automated driving vehicle exterior notification is performed.

Further, the vehicle interior presentation controller 102 may cause the vehicle interior notification at an earlier timing than a timing when the vehicle exterior notification controller 105 causes the automated driving vehicle exterior notification. In an example of using an LED lamp as the vehicle exterior display 191, the vehicle exterior notification lamp image in the foreground image may be turned on at a timing earlier than the lighting of the LED lamp. For example, the vehicle interior notification indicating that the automation level has changed may be performed at an earlier timing than the automated driving vehicle exterior notification indicating that the automation level has changed. According to this, it becomes possible for the driver to know that the automated driving vehicle exterior notification will be performed earlier than the timing at which the automated driving vehicle exterior notification is performed. Hereinafter, an example is described in which the vehicle exterior notification indicating that the automation level has changed and the automated driving vehicle interior notification indicating that the automation level has changed are performed at the same timing.

Here, an example in which the vehicle interior notification is performed in the foreground image has been shown. However, the present disclosure is not limited to this. For example, in the case of using the subject vehicle simulation image, when the automated driving vehicle exterior notification is performed in the image area and a display similar to the automated driving vehicle exterior notification is performed in the area, the foreground image may not be used. Further, the present disclosure is not limited to the configuration in which the vehicle interior notification is performed by an image. For example, the vehicle interior notification may be performed by a meter lamp or indicator. In this case, the lamps and indicators of the meter may be light up in conjunction with the execution of the automated driving vehicle exterior notification. In addition, here, the example in which the vehicle interior notification may be performed in the display manner has been described. However, the present disclosure is not limited to the example. For example, the vehicle interior notification by audio may be similarly performed in conjunction with the execution of the automated driving vehicle exterior notification.

The vehicle exterior notification controller 105 uses the automated driving-related state identified by the state identification unit 103 to cause the automated driving vehicle exterior notification during the automated driving of the subject vehicle. In this case, the identification result of the current automation level may be used as the automated driving-related state. According to this, it becomes possible to notify the periphery of the subject vehicle that the subject vehicle is performing the automated driving. As an example, when the automation level of the subject vehicle is LV 3 or higher, the vehicle exterior display 191 may be turned on. In other words, the vehicle exterior display 191 may be turned on during the automated driving without the monitoring obligation. When the vehicle exterior display 191 is a lamp, the lamp is turned on. When the vehicle exterior display 191 is a display or display panel, the display or display panel is turned on (in other words, is lighted). The vehicle exterior notification controller 105 may turn on the vehicle exterior display 191 when the automation level of the subject vehicle is LV 1 or higher. The vehicle exterior notification controller 105 may turn on the vehicle exterior display 191 when the automation level of the subject vehicle is LV 2 or higher.

The vehicle exterior notification controller 105 may change the type of vehicle exterior notification according to the automation level of the subject vehicle. For example, depending on the automation level, the hue of the lighting color may be switched, or the shade of the color may be switched. The switching of the color shade may be implemented by varying the brightness of the lamp.

The vehicle exterior notification controller 105 may use the automated driving-related state identified by the state identification unit 103 to cause the vehicle exterior notification (hereinafter, advance notification) of notifying the outside of the subject vehicle in advance of the possibility that the automation level will change when the automation level of the subject vehicle increases or decreases. When a lamp is used as the vehicle exterior display 191, for example, the advance notification may be expressed by blinking.

When the lighting detection unit 104 detects the start of lighting of the specific indicator lamp during the automated driving of the subject vehicle, the vehicle exterior notification controller 105 changes the automated driving vehicle exterior notification so that the visual recognition of the display becomes difficult. For example, when the lighting detection unit 104 detects the start of lighting of the specific indicator lamp during the automated driving of the subject vehicle, the vehicle exterior notification controller 105 may change the automated driving vehicle exterior notification so that the display becomes difficult to be seen.

A change in the direction in which the display of the automated driving vehicle exterior notification becomes difficult to be seen may be made by turning off the display of the automated driving vehicle exterior notification. In other words, the vehicle exterior notification controller 105 may change the display of the automated driving vehicle exterior notification so that the display becomes difficult to be seen by turning off the display of the automated driving vehicle exterior notification. According to this, the automated driving vehicle exterior notification is turned off, so that the periphery can clearly understand that the specific indicator lamp should be emphasized. When the lamp is used as the vehicle exterior display 191, the vehicle exterior notification controller 105 may make the display of the automated driving vehicle exterior notification difficult to be seen by turning off the lamp. When the display or the display panel is used as the vehicle exterior display 191, the vehicle exterior notification controller 105 may turn off the display or the display panel to make it difficult to be seen the display of the automated driving vehicle exterior notification.

Further, the change for causing the visual recognition of the display of the automated driving vehicle exterior notification to become difficult may be performed by lowering the brightness of the automated driving vehicle exterior notification. In other words, the vehicle exterior notification controller 105 may change the display of the automated driving vehicle exterior notification so that the display becomes difficult to be seen by lowering the brightness of the automated driving vehicle exterior notification. In this case, it is assumed that the brightness of the automated driving vehicle exterior notification is lowered without turning off the display of the automated driving vehicle exterior notification. According to this, since the brightness of the automated driving vehicle exterior notification is lowered, it becomes easy for the periphery to understand that the specific indicator lamp should be emphasized while the automated driving vehicle exterior notification can be confirmed from the periphery. When the lamp is used as the vehicle exterior display 191, the vehicle exterior notification controller 105 may make the display of the automated driving vehicle exterior notification difficult to be seen by lowering the brightness of the lamp. When the display or the display panel is used as the vehicle exterior display 191, the vehicle exterior notification controller 105 may lower the brightness of the display or the display panel for causing the visual recognition of the display of the automated driving vehicle exterior notification to become difficult.

When the lighting detection unit 104 detects the start of lighting of the specific indicator lamp during the automated driving of the subject vehicle, the vehicle exterior notification controller 105 may change the automated driving vehicle exterior notification so that the display becomes difficult to be seen, instead of the type of the specific indicator lamp of which lighting start has been detected. Thereby, when the specific indicator lamp starts lighting, by causing the visual recognition for the automated driving vehicle exterior notification to become difficult, it becomes easier for the periphery to understand that the specific indicator lamp should be emphasized.

When the lighting detection unit 104 detects the start of lighting of the specific indicator lamp during the automated driving of the subject vehicle, the vehicle exterior notification controller 105 may switch whether to change the automated driving vehicle exterior notification so that the display becomes difficult to be seen, according to the type of the specific indicator lamp of which lighting start has been detected. For example, this switching may be performed in a following manner.

Figure 13:
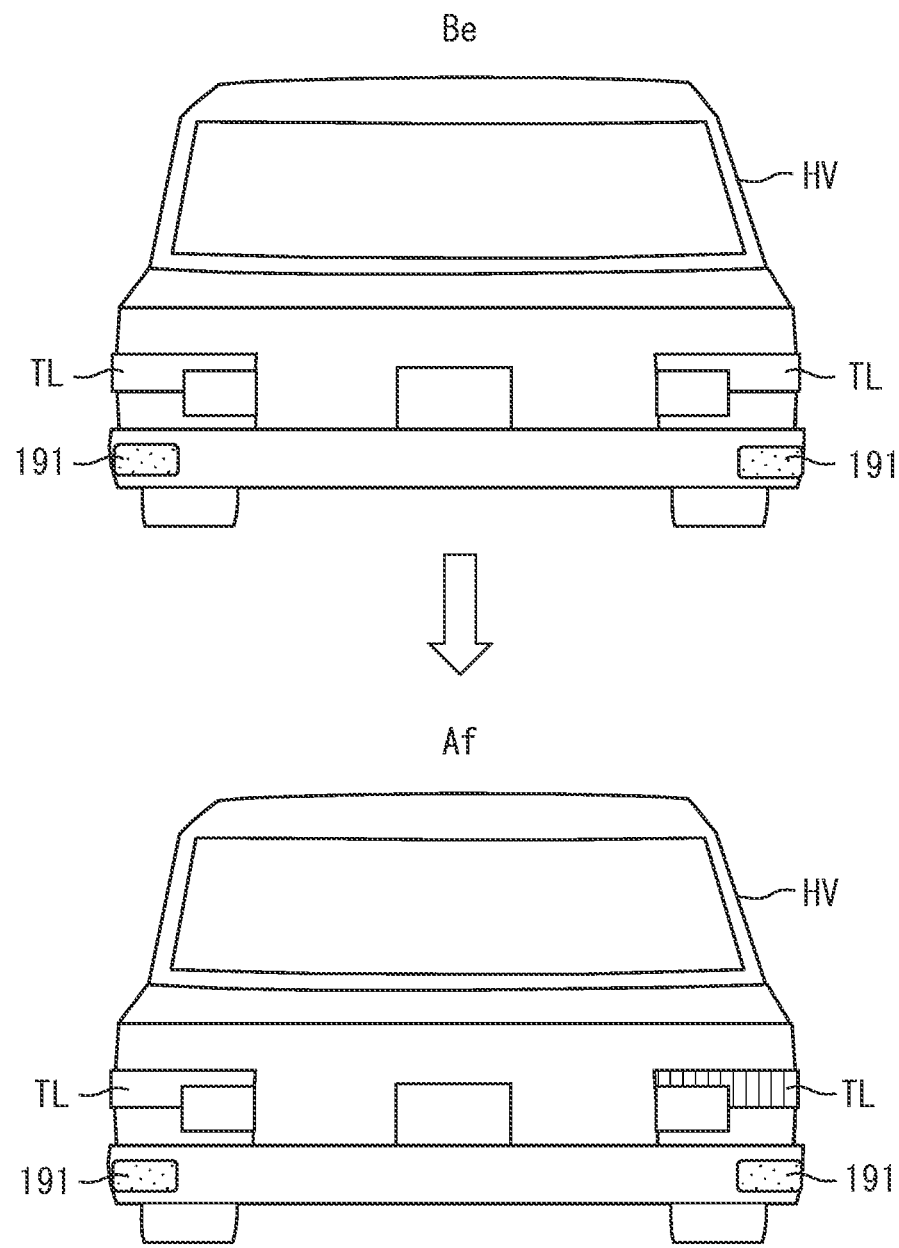
FIG. 13 is a diagram for illustrating an example of a mode of the automated driving vehicle exterior notification when the start of lighting of a turn lamp is detected during the automated driving.

When the lighting detection unit 104 detects the start of lighting of the turn lamp TL during the automated driving of the subject vehicle, it is preferable that the vehicle exterior notification controller 105 does not change the automated driving vehicle exterior notification so that the display of the automated driving vehicle exterior notification becomes difficult to be seen. In other words, it is preferable that the vehicle exterior notification controller 105 does not perform the change that causes the visual recognition of the display of the automated driving vehicle exterior notification to be difficult. Here, with reference to FIG. 13, an example will be described. The example is an example of a mode of the automated driving vehicle exterior notification when the start of lighting of the turn lamp TL is detected during the automated driving. Be in FIG. 13 indicates a state before the turn lamp TL is turned on during the automated driving. Af in FIG. 13 indicates a state at the lighting start time of the turn lamp TL during the automated driving. As shown in FIG. 13, even when the turn lamp TL starts lighting, the mode of the automated driving vehicle exterior notification is not changed. That is, even when the turn lamp TL starts lighting, the automated driving vehicle exterior notification is not extinguished and the brightness is not lowered.

Figure 14:
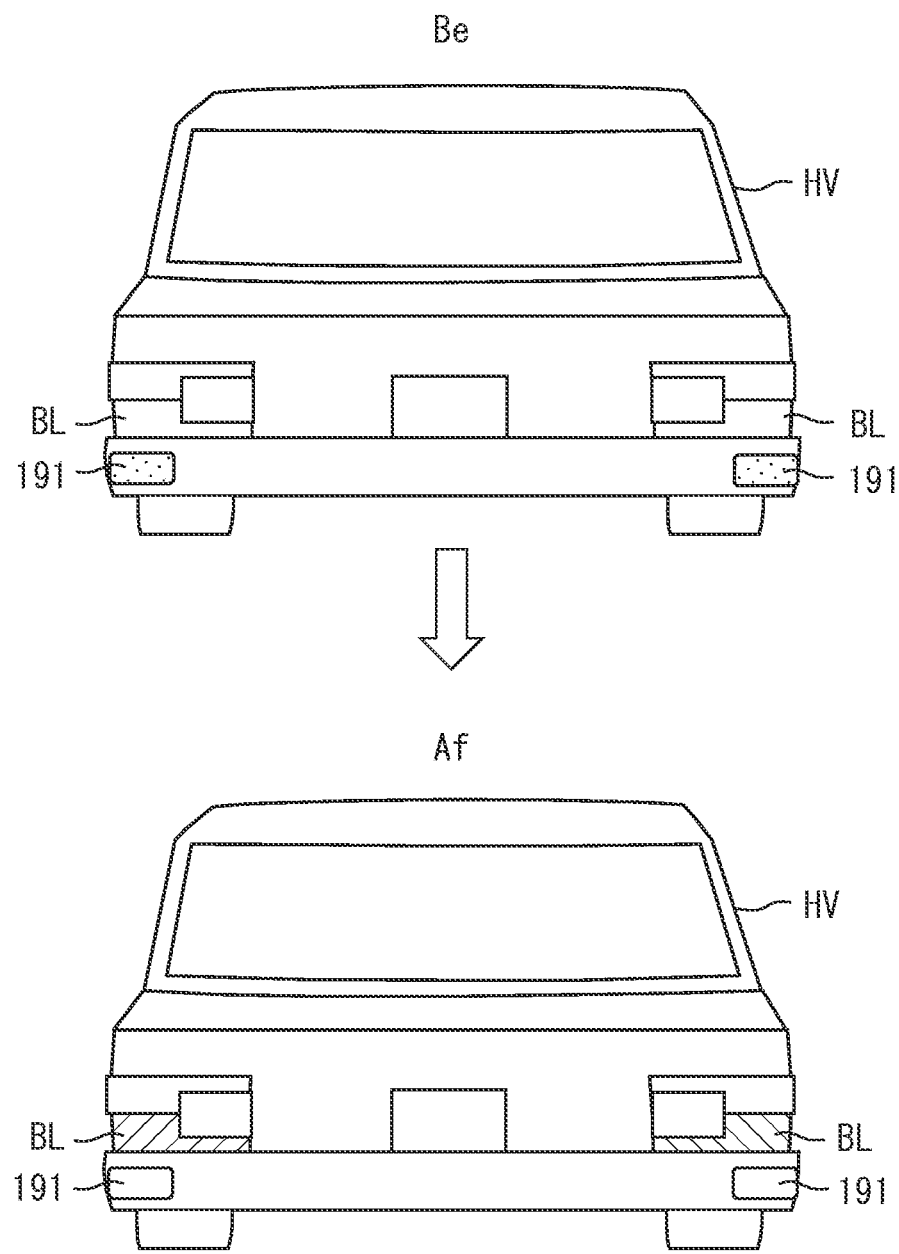
FIG. 14 is a diagram for illustrating an example of a mode of the automated driving vehicle exterior notification when the start of lighting of a brake lamp is detected during the automated driving.
Figure 15:
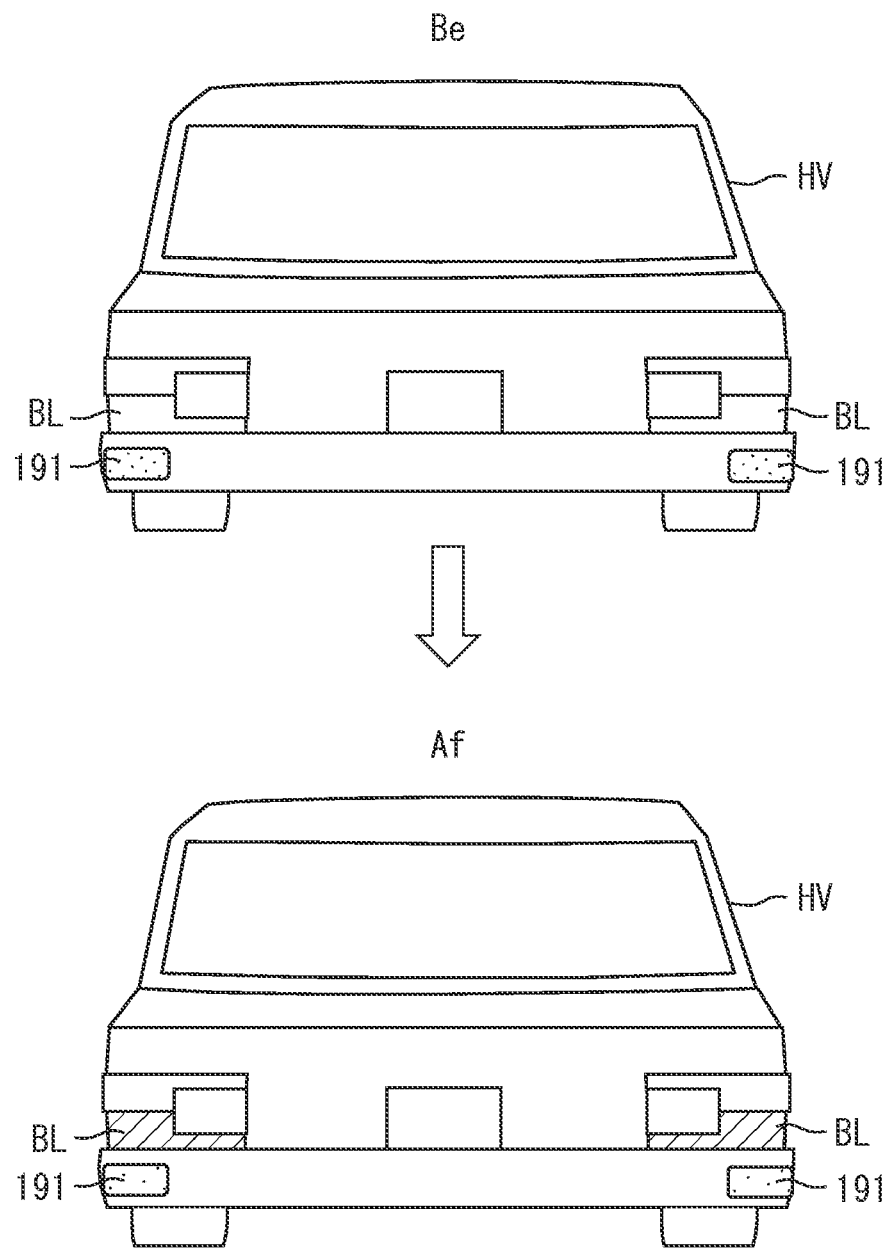
FIG. 15 is a diagram for illustrating an example of a mode of the automated driving vehicle exterior notification when the start of lighting of a brake lamp is detected during the automated driving.

On the other hand, it is preferable that, based on the fact that the lighting detection unit 104 has detected the start of lighting of the brake lamp BL during the automated driving of the subject vehicle, the vehicle exterior notification controller 105 changes the display of the automated driving exterior notification so that the display of the automated driving vehicle exterior notification becomes difficult to be seen. Here, with reference to FIGS. 14 and 15, an example will be described. The example is an example of a mode of the automated driving vehicle exterior notification when the start of lighting of the brake lamp BL is detected during the automated driving. Be in FIGS. 14 and 15 indicates a state before the brake lamp BL is turned on during the automated driving. Af in FIGS. 14 and 15 indicates a state of the lighting start time of the brake lamp BL during the automated driving. As an example, as shown in FIG. 14, when the brake lamp BL starts lighting, the automated driving vehicle exterior notification may be turned off. Further, as shown in FIG. 15, when the brake lamp BL starts lighting, the brightness of the automated driving vehicle exterior notification may be lowered compared to the state before the lighting of the brake lamp BL starts.

The brake lamp BL starts lighting up when braking, whereas the turn lamp TL starts lighting up before the turn starts. Therefore, when the turn lamp TL starts lighting, the following vehicle has more time to determine the situation than when the brake lamp BL starts lighting. On the other hand, according to the above configuration, even when the specific indicator lamp starts to light up, the periphery becomes possible to easily recognize also the automated driving vehicle exterior notification at the lighting start time of the specific indicator lamp having the type that allows the periphery to determine the situation. On the other hand, when the indicator lamp having the type that does not sufficiently allow the periphery to determine the situation starts to light up, it is possible to easily understand that the indicator lamp should be emphasized.

Further, when the lighting detection unit 104 detects the start of lighting of the hazard lamp EL during the automated driving of the subject vehicle, the vehicle exterior notification controller 105 may change the automated driving vehicle exterior notification so that the display of the automated driving vehicle exterior notification becomes difficult to be seen, for example. This is because the vehicle stops when the hazard lamp EL starts to light up. Therefore, there is little need for the periphery to recognize the automated driving vehicle exterior notification, and it is considered that it is better to make the periphery pay more attention to the hazard lamp EL than to the automated driving vehicle exterior notification.

When the lighting detection unit 104 detects the start of lighting of the brake lamp BL during the traffic congestion limit automated driving of the subject vehicle based on the automated driving-related state identified by the state identification unit 103, it is preferable that the vehicle exterior notification controller 105 does not change the automated driving vehicle exterior notification so that the display of the automated driving vehicle exterior notification becomes difficult to be seen. On the other hand, it is preferable that, when the lighting detection unit 104 has detected the start of lighting of the brake lamp BL during the area limit automated driving of the subject vehicle, the vehicle exterior notification controller 105 changes the display of the automated driving exterior notification so that the display of the automated driving vehicle exterior notification becomes difficult to be seen.

Vehicles in the traffic congestion are likely to brake frequently. Therefore, the brake lamp BL is frequently turned on during the traffic congestion. Here, when the display of the automated driving vehicle exterior notification is changed so as to be difficult to be seen at the lighting time of the brake lamp BL, a situation will frequently arise where the display of the automated driving vehicle exterior notification becomes difficult to be seen. Therefore, there is a possibility that the number of opportunities for the objects in the periphery to recognize the automated driving vehicle exterior notification becomes too few On the other hand, according to the above configuration, during the traffic congestion limit automated driving, even when the start of lighting of the brake lamp BL is detected, the display of the automated driving vehicle exterior notification is not changed so as to be difficult to be seen. That is, the visual recognition of the display does not become difficult. Therefore, it is possible to prevent the opportunity for the periphery to recognize the automated driving vehicle exterior notification from becoming too few. It should be noted that, during the traffic congestion, the vehicle also run at low speeds, so it is easy for the periphery to make determination about the situation. Therefore, there is little need to provide, to the periphery, the notification indicating that the brake lamp BL should be emphasized in an easy-to-understand manner. Therefore, during the traffic congestion limit automated driving, even when the brake lamp BL starts lighting, it is not necessary to inform the periphery that the brake lamp BL should be emphasized in the easy-to-understand manner.

<Notification Control-Related Process by HCU>

Figure 16:
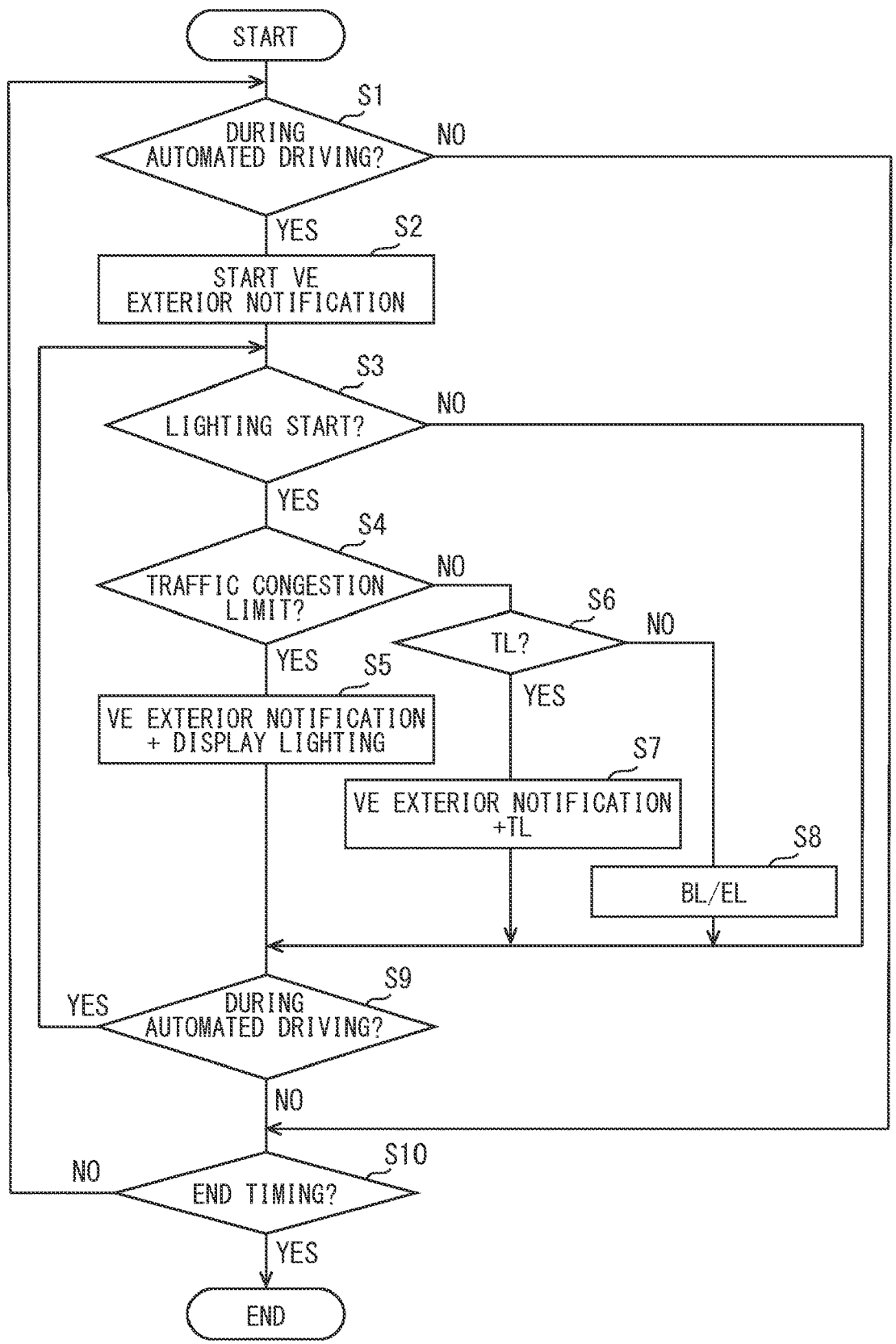
FIG. 16 is a diagram for illustrating an example of a flow of a notification control-related process by the HCU.

Here, an example of the flow of processes (hereinafter referred to as notification control-related process) related to the control of the automated driving vehicle exterior notification by the HCU 10 will be described using a flowchart of FIG. 16. The process shown in FIG. 16 may be configured to, for example, start when a switch for starting an internal combustion engine or a motor generator of the subject vehicle is turned on. The switch for starting the vehicle is also referred to as a power switch. In the example of FIG. 16, a state where the automation level is LV 3 is regarded as the state where the vehicle is performing the automated driving. Although omitted in the flowchart of FIG. 16, when the automation level of the subject vehicle changes, the above-described advance notification may be performed.

First, in S1, when the state identification unit 103 specifies that the current automation level is LV 3 (YES in S1), the process proceeds to S2. In other words, when it is identified that the vehicle is performing the automated driving, the process proceeds to S2. On the other hand, when the state identification unit 103 specifies that the current automation level is LV 2 or lower (NO in S1), the process proceeds to S9. In other words, when it is identified that the vehicle is not performing the automated driving, the process proceeds to S9.

In S2, the vehicle exterior notification controller 105 starts the automated driving vehicle exterior notification. In S3, when the lighting detection unit 104 detects the start of lighting of the specific indicator lamp (YES in S3), the process proceeds to S4. On the other hand, when the lighting detection unit 104 does not detect the start of lighting of the specific indicator lamp (NO in S3), the process proceeds to S9.

In S4, when the state identification unit 103 identifies the state where the vehicle is performing the traffic congestion limit automated driving (YES in S4), the process proceeds to S5. On the other hand, when the state identification unit 103 does not identify the state where the vehicle is in the traffic congestion limit automated driving (NO in S4), the process proceeds to S6. Examples of a case where the state identification unit 103 does not identify the state where the vehicle is performing the traffic congestion limit automated driving include a case where the state where the area limit automated driving being performed is identified. In S5, in addition to turning on the specific indicator lamp whose start of lighting was detected in S3, the vehicle exterior notification controller 105 continues the automated driving vehicle exterior notification in the same manner as before lighting of the specific indicator lamp, and the process proceeds to S9.

In S6, when the specific indicator lamp whose lighting start was detected in S3 is the turn lamp TL (YES in S6), the process proceeds to S7. On the other hand, when the specific indicator lamp whose lighting start was detected in S3 is not the turn lamp TL (NO in S6), the process proceeds to S8. Examples of cases where the specific indicator lamp whose lighting start is detected in S3 is not the turn lamp TL include the case of the brake lamp BL and the case of the hazard lamp EL.

In S7, in addition to turning on the turn lamp TL, the vehicle exterior notification controller 105 continues the automated driving vehicle exterior notification in the same manner as before lighting of the specific indicator lamp, and the process proceeds to S9. The lighting of the turn lamp TL is assumed to be blinking of the lamp. On the other hand, in S8, the vehicle exterior notification controller 105 changes the lighting of the specific indicator lamp whose lighting start was detected in S3 so that the display of the automated driving vehicle exterior notification becomes difficult to be seen, and the process proceeds to S9. For example, while the brake lamp BL or the hazard lamp EL is turned on, the automated driving vehicle exterior notification may be turned off.

In S9, when the state identification unit 103 continues to identify the state where the vehicle is performing the automated driving (YES in S9), the process returns to S3 and repeats the process. On the other hand, when the state identification unit 103 identifies the state where the vehicle is not performing the automated driving (NO in S9), the process proceeds to S9. That is, when the state where the vehicle is not performing the automated driving is identified, the process returns to S3 and repeats the process.

In S10, when it is the end time of the notification control-related process (YES in S10), the notification control-related process ends. On the other hand, when it is yet not the end time of the notification control-related process (NO in S10), the process returns to S1 and repeats the process. One example of the end timing of the notification control-related process is a timing when the power switch is turned off.

In FIG. 16, the case where the state in which the automation level is LV 3 is regarded as the state where the vehicle is performing the automated driving has been described as an example. However, the present disclosure is not necessarily limited to the case. The state where the automation level is LV 3 or higher may be regarded as the state where the vehicle is performing the automated driving.

In this case, when the automation level is LV 4 or higher, the process in S4 proceeds to S6. Alternatively, a state where the automation level is LV 1 or higher or LV 2 or higher may be regarded as the state where the vehicle is performing the automated driving. In this case, when the automation level is LV 1 to LV 2, the process in S4 proceeds to S6.

FIG. 16 shows the configuration for switching whether to change the mode of the automated driving vehicle exterior notification depending on whether the vehicle is performing the traffic congestion limit automated driving. However, the present disclosure is not necessarily limited to the configuration. For example, a configuration may be adopted in which whether to change the mode of the automated driving vehicle exterior notification is not switched depending on whether the vehicle is performing the traffic congestion limit automated driving. In addition, FIG. 16 shows a configuration for switching whether to change the mode of the automated driving vehicle exterior notification according to the type of the specific indicator lamp whose lighting start has been detected. However, the present disclosure is not necessarily the configuration. For example, regardless of the type of the specific indicator lamp whose lighting start is detected, whether to change the mode of the automated driving vehicle exterior notification for automated driving may not be switched.

According to the configuration of the first embodiment, it is possible to change the automated driving vehicle exterior notification so that the display becomes difficult to be seen based on the start of lighting of the specific indicator lamp. Therefore, when the specific indicator lamp starts lighting, it is possible to make it difficult to see the automated driving vehicle exterior notification and to make it easier for the periphery to understand that the specific indicator lamp should be emphasized. On the other hand, until the specific indicator lamp starts lighting, it is possible to make it easy for the periphery to understand that the automated driving vehicle exterior notification should be emphasized by performing the vehicle exterior notification without the change causing the visual recognition of the display to be difficult. As the result, the peripheral objects become possible to easily understand which of display and indicator lamp should be emphasized even when performing notification indicating an automated driving state of a subject vehicle by the display toward the outside of the subject vehicle, the indicator lamp is being used for performing notification that is different from the notification using the display.

Second Embodiment

In the first embodiment, the HCU 10 performs the functions of the state identification unit 103, the lighting detection unit 104, and the vehicle exterior notification controller 105. However, the present disclosure is not necessarily limited to this. For example, the functions of the state identification unit 103, the lighting detection unit 104, and the vehicle exterior notification controller 105 may be performed by an ECU other than the HCU 10. As an example, the functions of the state identification unit 103, the lighting detection unit 104, and the vehicle exterior notification controller 105 may be performed by the automated driving ECU 17.

Third Embodiment

The present disclosure is not limited to the configuration according to the first embodiment, but can also adopt the following configuration according to a third embodiment. The following will describe a detailed example of the third embodiment with reference to the accompanying drawings. The vehicle system 1 of the third embodiment is similar to the vehicle system 1 of the first embodiment, except for including an HCU 10a instead of the HCU 10.

Figure 17:
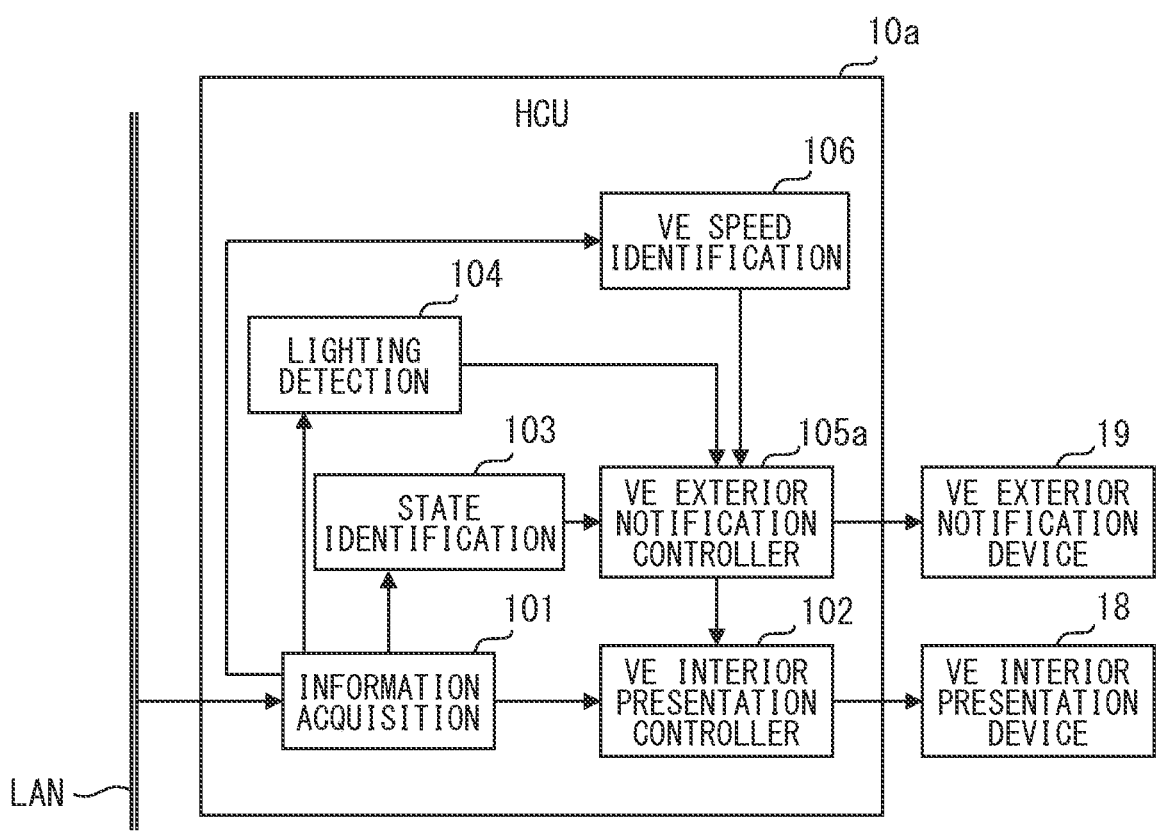
FIG. 17 is a diagram showing an example of a configuration of the HCU.

First, a schematic configuration of the HCU 10a will be described with reference to FIG. 17. As shown in FIG. 17, the HCU 10a includes the information acquisition unit 101, the vehicle interior presentation controller 102, the state identification unit 103, the lighting detection unit 104, the vehicle exterior notification controller 105a, and a vehicle speed identification unit 106 as functional blocks regarding the control of the vehicle interior presentation device 18 and the vehicle exterior notification device 19. The HCU 10a is similar to the HCU 10 of first embodiment except that the vehicle exterior notification controller 105a is provided instead of the vehicle exterior notification controller 105, and except that the vehicle speed identification unit 106 is provided. This HCU 10a also corresponds to the vehicle notification control device. Execution of a process of each functional block of the HCU 10a by the computer corresponds to execution of the vehicle notification control method.

The vehicle speed identification unit 106 identifies the vehicle speed of the subject vehicle. The vehicle speed identification unit 106 identifies the vehicle speed of the subject vehicle from the sensing result of the vehicle speed sensor of the vehicle state sensors 14 acquired by the information acquisition unit 101.

The vehicle exterior notification controller 105a is similar to the vehicle exterior notification controller 105 of the first embodiment, except that whether to change the mode of the automated driving vehicle exterior notification is switched according to the vehicle speed identified by the vehicle speed identification unit 106, instated of switching the mode of the automated driving vehicle exterior notification according to whether the vehicle is performing the traffic congestion limit automated driving.

By using the automated driving-related state identified by the state identification unit 103, the vehicle exterior notification controller 105 changes the automated driving vehicle exterior notification so that the display of the automated driving vehicle exterior notification becomes difficult to be seen, when the lighting detection unit 104 has detected the lighting start of the specific indicator lamp during the automated driving of the subject vehicle and also when the vehicle speed identified by the vehicle speed identification unit 106 is equal to or higher than the predetermined threshold. The predetermined threshold referred to here may be a value that distinguishes, in other words, determine whether the vehicle is in the traffic congestion. As an example, the average vehicle speed during the traffic congestion and the like may be used. On the other hand, the vehicle exterior notification controller 105a does not change the automated driving vehicle exterior notification so that the display of the automated driving vehicle exterior notification becomes difficult to be seen, even when the lighting detection unit 104 has detected the lighting start of the specific indicator lamp and also when the vehicle speed identified by the vehicle speed identification unit 106 is less than the above threshold.

Vehicles with low vehicle speed are likely to brake frequently during the traffic congestion and the like. Here, when the display of the automated driving vehicle exterior notification is changed so as to be difficult to be seen at the lighting time of the brake lamp BL, a situation will frequently arise where the display of the automated driving vehicle exterior notification becomes difficult to be seen. Therefore, there is a possibility that the number of opportunities for the objects in the periphery to recognize the automated driving vehicle exterior notification becomes too few On the other hand, during the automated driving with the vehicle speed less than the predetermined speed, even when the start of lighting of the brake lamp BL is detected, the automated driving vehicle exterior notification is not changed so that the display of the automated driving vehicle exterior notification becomes difficult to be seen. Therefore, it is possible to prevent the opportunity for the periphery to recognize the automated driving vehicle exterior notification from becoming too few.

When adopting the configuration of the third embodiment, for example, in the flowchart of FIG. 16, the process of S4 may be changed to the following process. For example, in S4, when the vehicle speed identification unit 106 identifies the state where the vehicle speed is less than the predetermined threshold value, the process may proceed to S5. On the other hand, when the vehicle speed identification unit 106 identifies the state where the vehicle speed is equal to or higher than the predetermined threshold value, the process may proceed to S6.

Fourth Embodiment

In the third embodiment, the HCU 10 performs the functions of the state identification unit 103, the lighting detection unit 104, the vehicle exterior notification controller 105a, and the vehicle speed identification unit 106. However, the present disclosure is not necessarily limited to this. For example, the functions of the state identification unit 103, the lighting detection unit 104, the vehicle exterior notification controller 105a, and the vehicle speed identification unit 106 may be performed by an ECU other than the HCU 10a. As an example, the functions of the state identification unit 103, the lighting detection unit 104, the vehicle exterior notification controller 105a, and the vehicle speed identification unit 106 may be performed by the automated driving ECU 17.

Fifth Embodiment

Further, as the vehicle exterior display 191, a lamp is used, and the lamp lights toward the outside of the subject vehicle for purposes other than the automated driving vehicle exterior notification, which is notification of information related to the automated driving. In other words, a configuration (hereinafter, fifth embodiment) may be adopted in which the existing lamp is also used for the automated driving vehicle exterior notification. Examples of the existing lamp include a side light, the turn lamp TL, the tail lamp, the brake lamp BL, the back lamp RL, the license number lamp, the back fog light, and the like.

As the existing lamp that is also used for the automated driving vehicle exterior notification, it is preferable to use a lamp that is not frequently flashed for purposes other than the automated driving vehicle exterior notification. This is to prevent a situation where the automated driving vehicle exterior notification cannot be performed at the timing at which the automated driving vehicle exterior notification should be performed. As the existing lamp also used for the automated driving vehicle exterior notification, for example, the back lamp RL, the sidelight (also referred to as parking light), the license number lamp, the back fog light, and the like, excluding the above specific indicator lamp, are preferable. For the existing lamp that is also used for the automated driving vehicle exterior notification, confusion can be avoided by, for example, using different hues of lamp colors between the automated driving vehicle exterior notification and purposes other than the vehicle exterior notification.

Figure 18:
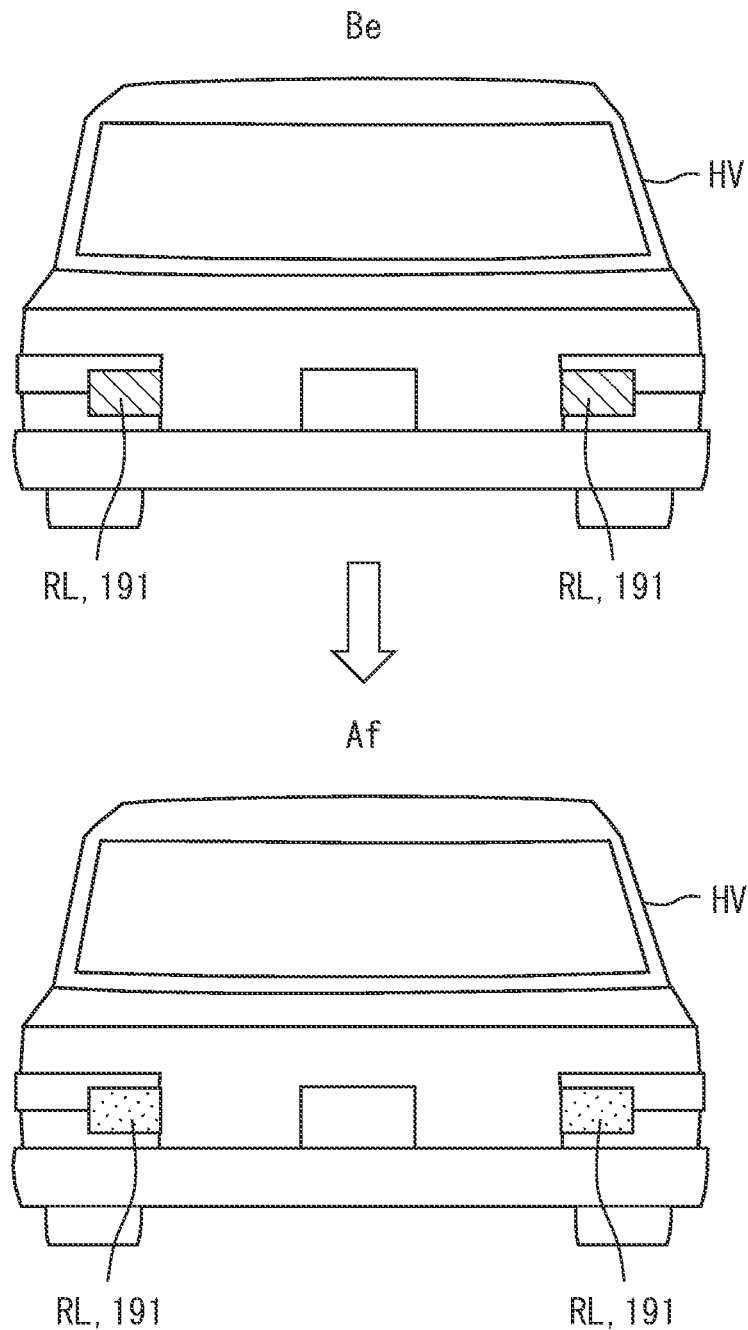
FIG. 18 is a diagram for illustrating an example of a configuration in which a back lamp is also used for the automated driving vehicle exterior notification.

Here, with reference to FIG. 18, an example of a configuration in which the back lamp RL is also used for the automated driving vehicle exterior notification will be described. For example, the light color of the back lamp RL may be white, and the light color of the automated driving vehicle exterior notification may be blue. The back lamp RL and the vehicle exterior display 191 may be used by switching the light color of the same lamp. In addition, the lamp may be shared by switching the light emission target among the light-emitting elements having different colors provided in the same area. Be in FIG. 18 indicates a state before the back lamp RL is turned on during the automated driving. Af in FIG. 18 indicates a state at the time when the back lamp RL starts lighting during the automated driving. As an example, as shown in FIG. 18, until the back lamp RL is turned on, the light color of the vehicle exterior display 191 may be emitted to perform the automated driving vehicle exterior notification. When the back lamp RL is turned on, the switching may be performed to emit the lighting color as the vehicle exterior display 191 and the light emission of the lighting color corresponding to the back lamp RL may be performed.

According to the configuration of the fifth embodiment, since the existing lamp is also used for the automated driving vehicle exterior notification, it is possible to reduce the cost for performing the automated driving vehicle exterior notification. In addition, since the existing lamp is also used, it is possible to save the trouble of designing the installation place.

Sixth Embodiment

The present disclosure is not limited to the configuration according to the first embodiment, but can also adopt the following configuration according to a sixth embodiment. The following will describe a detailed example of the sixth embodiment with reference to the accompanying drawings. The vehicle system 1 of the sixth embodiment is similar to the vehicle system 1 of the first embodiment, except for including an HCU 10b instead of the HCU 10.

Figure 19:
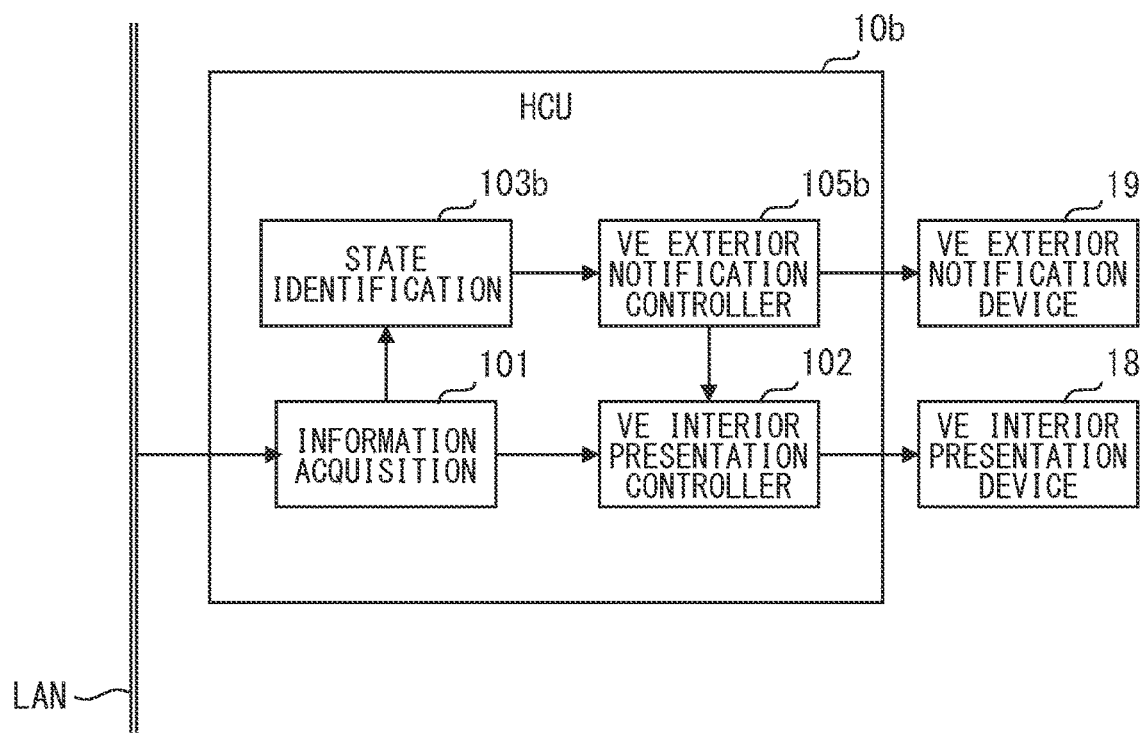
FIG. 19 is a diagram showing an example of a schematic configuration of an HCU.

Next, a schematic configuration of the HCU 10b will be described with reference to FIG. 19. As shown in FIG. 19, the HCU 10b includes the information acquisition unit 101, the vehicle interior presentation controller 102, a state identification unit 103b, and a vehicle exterior notification controller 105b as functional blocks regarding the control of the vehicle interior presentation device 18 and the vehicle exterior notification device 19. The HCU 10b is similar to the HCU 10 of the first embodiment, except that the HCU 10b includes the state identification unit 103b and the vehicle exterior notification controller 105b instead of the state identification unit 103 and the vehicle exterior notification controller 105, and that the HCU 10b does not include the lighting detection unit 104. This HCU 10b also corresponds to the vehicle notification control device. Execution of a process of each functional block of the HCU 10b by the computer also corresponds to execution of the vehicle notification control method.

The state identification unit 103 identifies the automated driving-related state that is the state of the subject vehicle and is related to the automated driving. The process of the state identification unit 103b also corresponds to the state identification process. The state identification unit 103b identifies the current automation level as the automated driving-related state. The state identification unit 103b may identify the current automation level by monitoring the automated driving ECU 17.

The vehicle exterior notification controller 105b controls the vehicle exterior notification device 19 to perform the automated driving vehicle exterior notification. That is, the vehicle exterior notification controller 105b controls the vehicle exterior display 191 to perform the vehicle exterior notification. The process by the vehicle exterior notification controller 105b also corresponds to the vehicle exterior notification control process. The vehicle exterior notification controller 105 may perform the automated driving exterior notification from the audio output device 192, or may not to cause the automated driving exterior notification from the audio output device 192. In the following, the automated driving vehicle exterior notification from the vehicle exterior display 191 will be described.

Similarly to the vehicle exterior notification controller 105 of the first embodiment, the vehicle exterior notification controller 105b uses the automated driving-related state identified by the state identification unit 103b to cause the automated driving vehicle exterior notification during the automated driving of the The vehicle exterior notification controller 105b uses the automated driving-related state identified by the state identification unit 103b to cause the automated driving vehicle exterior notification during the automated driving of the subject vehicle, and the brightness of the caused vehicle exterior notification is lower than that at the lighting time of the specific indicator lamp. When the lamp is used as the vehicle exterior display 191, the vehicle exterior notification controller 105 may light the lamp during the automated driving and keep the lamp brightness to be lower than that of the lighting of the specific indicator lamp. When the display or the display panel is used as the vehicle exterior display 191, the vehicle exterior notification controller 105 may turn on the display or the display panel during the automated driving, and keep the brightness of the display or the display panel to be lower than that at the lighting time of the specific indicator lamp. As an example, by pre-storing, in the non-volatile memory of the HCU 10b, a control value at which the brightness of the automated driving vehicle exterior notification is lower than that at the lighting time of the specific indicator lamp of the subject vehicle, the vehicle exterior notification controller 105b may cause the automated driving vehicle exterior notification of which brightness is lower than that at the lighting time of the specific indicator lamp.

According to the configuration of the sixth embodiment, it is possible to perform the automated driving vehicle exterior notification with the lower brightness than at the lighting time of the specific indicator lamp. Therefore, even when the specific indicator lamp starts lighting, it is possible to make it easier for the periphery to understand that the specific indicator lamp should be emphasized by setting the brightness of the automated driving vehicle exterior notification to be lower than that of the specific indicator lamp. As the result, the peripheral objects become possible to easily understand which of display and indicator lamp should be emphasized even when performing notification indicating an automated driving state of a subject vehicle by the display toward the outside of the subject vehicle, the indicator lamp is being used for performing notification that is different from the notification using the display.

Seventh Embodiment

In the sixth embodiment, the HCU 10b performs the functions of the state identification unit 103b and the vehicle exterior notification controller 105b. However, the present disclosure is not necessarily limited to the configuration. For example, the functions of the state identification unit 103b and the vehicle exterior notification controller 105b may be performed by an ECU other than the HCU 10b. As an example, the functions of the state identification unit 103b and the vehicle exterior notification controller 105b may be performed by the automated driving ECU 17.

Eighth Embodiment

The present disclosure is not limited to the configuration described in the first embodiment, but can also adopt the following configuration as an eighth embodiment. The following will describe a detailed example of the eighth embodiment with reference to the accompanying drawings.

<Schematic Configuration of Vehicle System>

Figure 20:
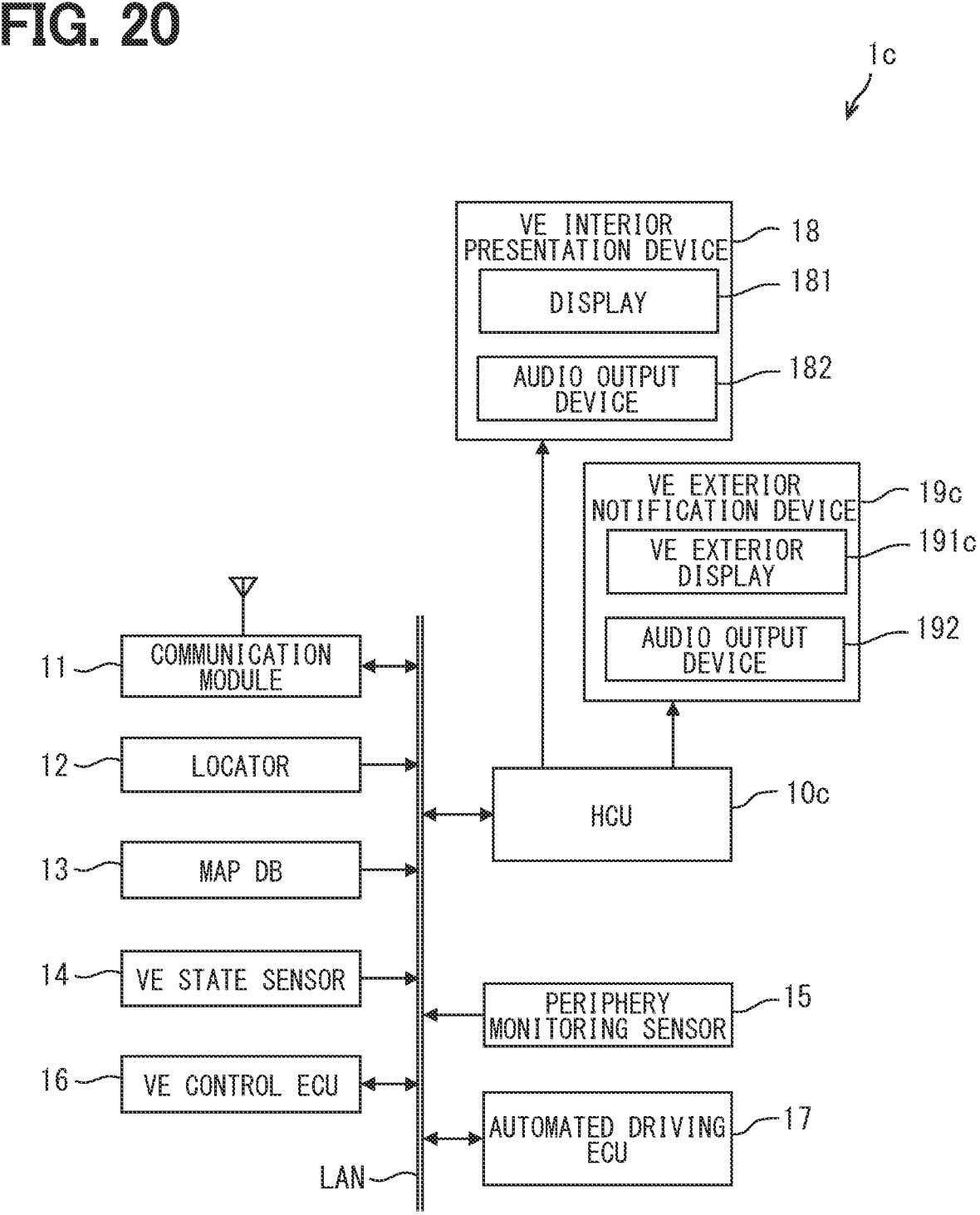
FIG. 20 is a diagram showing an example of a schematic configuration of a vehicle system.

A vehicle system 1c shown in FIG. 20 can be used in an automobile. As shown in FIG. 20, the vehicle system 1c includes an HCU 10c, the communication module 11, the locator 12, the map DB 13, the vehicle state sensor 14, the periphery monitoring sensor 15, the vehicle control ECU 16, the automated driving ECU 17, the vehicle interior presentation device 18, and a vehicle exterior notification device 19c. The vehicle system 1c is similar to the vehicle system 1 of the first embodiment, except that the vehicle system 1c includes the HCU 10c and the vehicle exterior notification device 19c instead of the HCU 10 and the vehicle exterior notification device 19. Although the vehicle using the vehicle system 1c is not necessarily limited to an automobile, hereinafter, an example using the automobile will be described.

The vehicle exterior notification device 19c has a vehicle exterior display 191c and the audio output device 192. The vehicle exterior display 191c is similar to the vehicle exterior notification device 19 of the first embodiment except that the vehicle exterior display 191c is provided instead of the vehicle exterior display 191. The vehicle exterior display 191c is similar to the vehicle exterior indicator 191 of the first embodiment except that the vehicle exterior display 191c is provided on the rear portion of the subject vehicle and at least one (hereinafter referred to as a non-rear portion) of the front portion or the side portion of the subject vehicle. For example, the vehicle exterior display 191c at the front of the subject vehicle may be provided at the left and right corners of a front bumper. The vehicle exterior display 191c at the front of the subject vehicle may be provided in the vicinity of the central portion in the vehicle width direction of the front of the vehicle. The vehicle exterior display 191c on the side portion of the subject vehicle may be provided on the left and right side surfaces of the subject vehicle. As the vehicle exterior display 191c on the side portion of the subject vehicle, the vehicle exterior display 191c provided at the left and right corners of the front bumper and/or a rear bumper may be used.

<Schematic Configuration of HCU>

Figures 21, 22:
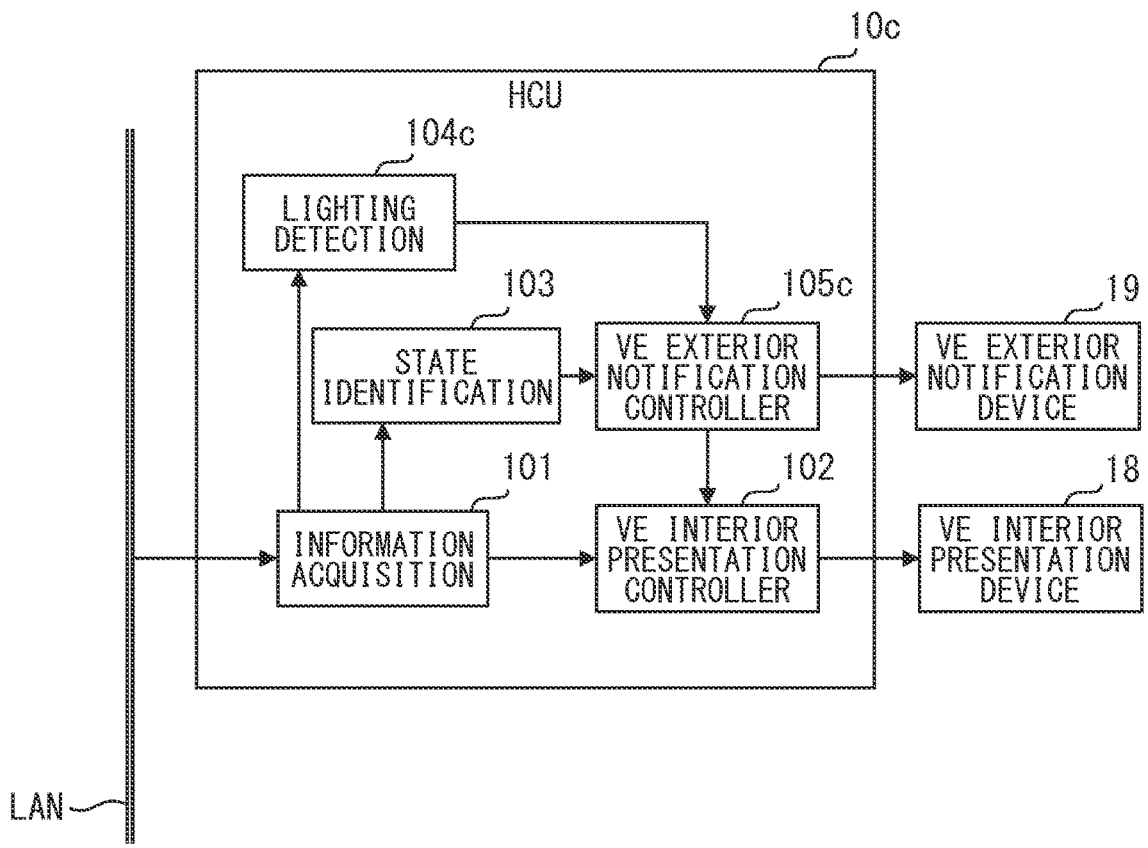
FIG. 21 is a diagram showing an example of a configuration of an HCU.
FIG. 22 is a diagram for illustrating an example of change in the automated driving vehicle exterior notification according to an installation place of a vehicle exterior display when a lighting start of the brake lamp is detected.

As shown in FIG. 21, the HCU 10c includes the information acquisition unit 101, the vehicle interior presentation controller 102, the state identification unit 103, the lighting detection unit 104c, and a vehicle exterior notification controller 105c as functional blocks regarding the control of the vehicle interior presentation device 18 and the vehicle exterior notification device 19c. The HCU 10c is similar to the HCU 10 of the first embodiment, except that the HCU 10c includes the lighting detection unit 104c and the vehicle exterior notification controller 105c are provided instead of the lighting detection unit 104 and the vehicle exterior notification controller 105. This HCU 10*c* also corresponds to the vehicle notification control device. Execution of a process of each functional block of the HCU 10*c* by the computer also corresponds to execution of the vehicle notification control method.

The lighting detection unit 104*c* is similar to the lighting detection unit 104 of the first embodiment, except that the lighting detection unit 104*c* at least detects the lighting start of the brake lamp BL of the subject vehicle as the lighting start of the specific indicator lamp.

Similarly to the vehicle exterior notification controller 105 of the first embodiment, the exterior notification control unit 105*c* changes the automated driving vehicle exterior notification of the vehicle exterior display 191*c* at the rear portion of the subject vehicle so that the display becomes difficult to be seen, in response to the detection of the lighting start of the brake light by the lighting detection unit 104*c*. On the other hand, even when the lighting detection unit 104*c* detects the lighting start of the brake lamp BL, the vehicle exterior notification controller 105*c* causes the vehicle exterior display 191*c* provided at the non-rear portion to display the automated driving vehicle exterior notification without changing the display so that the display becomes difficult to be seen. For example, the vehicle exterior notification controller 105*c* may display the automated driving exterior notification without changing the display to make it difficult to be seen by not turning off the display. In addition, the vehicle exterior notification controller 105*c* may display the automated driving exterior notification without lowering the brightness of the automated driving vehicle exterior notification.

The brake lamp BL is provided at the rear portion of the subject vehicle. Therefore, it is difficult to disperse the peripheral awareness of the lighting of the brake lamp BL when the vehicle exterior display 191*c* performs the automated driving vehicle exterior notification. Therefore, even when the brake lamp BL is turned on, there is little need to make the display difficult to be seen. According to the configuration of the eighth embodiment, even when the brake lamp BL is turned on, it is possible to continuously provide the information related to the automated driving to the outside of the vehicle without changing the display of the automated driving vehicle exterior notification with the little need to cause the visual recognition of the display to become difficult. In other words, it is possible to continuously provide the information so that the display does not become difficult to be seen.

Here, with reference to FIG. 22, an example of change in the automated driving vehicle exterior notification according to the installation place of the vehicle exterior display 191 will be described. The change is change when the lighting start of the brake lamp BL is detected. As shown in FIG. 22, the vehicle exterior notification controller 105*c* may turn off the automated driving vehicle exterior notification of the vehicle exterior display 191*c* provided at the rear portion of the subject vehicle when detecting the lighting start of the brake lamp BL. On the other hand, as shown in FIG. 22, the vehicle exterior notification controller 105*c* may keep the turn-on state of the automated driving vehicle exterior notification of the vehicle exterior display 191*c* provided at the non-rear portion of the subject vehicle when detecting the lighting start of the brake lamp BL.

Ninth Embodiment

The present disclosure is not limited to the configuration described in the first embodiment, but can also adopt the following configuration as a ninth embodiment. The following will describe a detailed example of the ninth embodiment with reference to the accompanying drawings.

<Schematic Configuration of Vehicle System>

Figure 23:
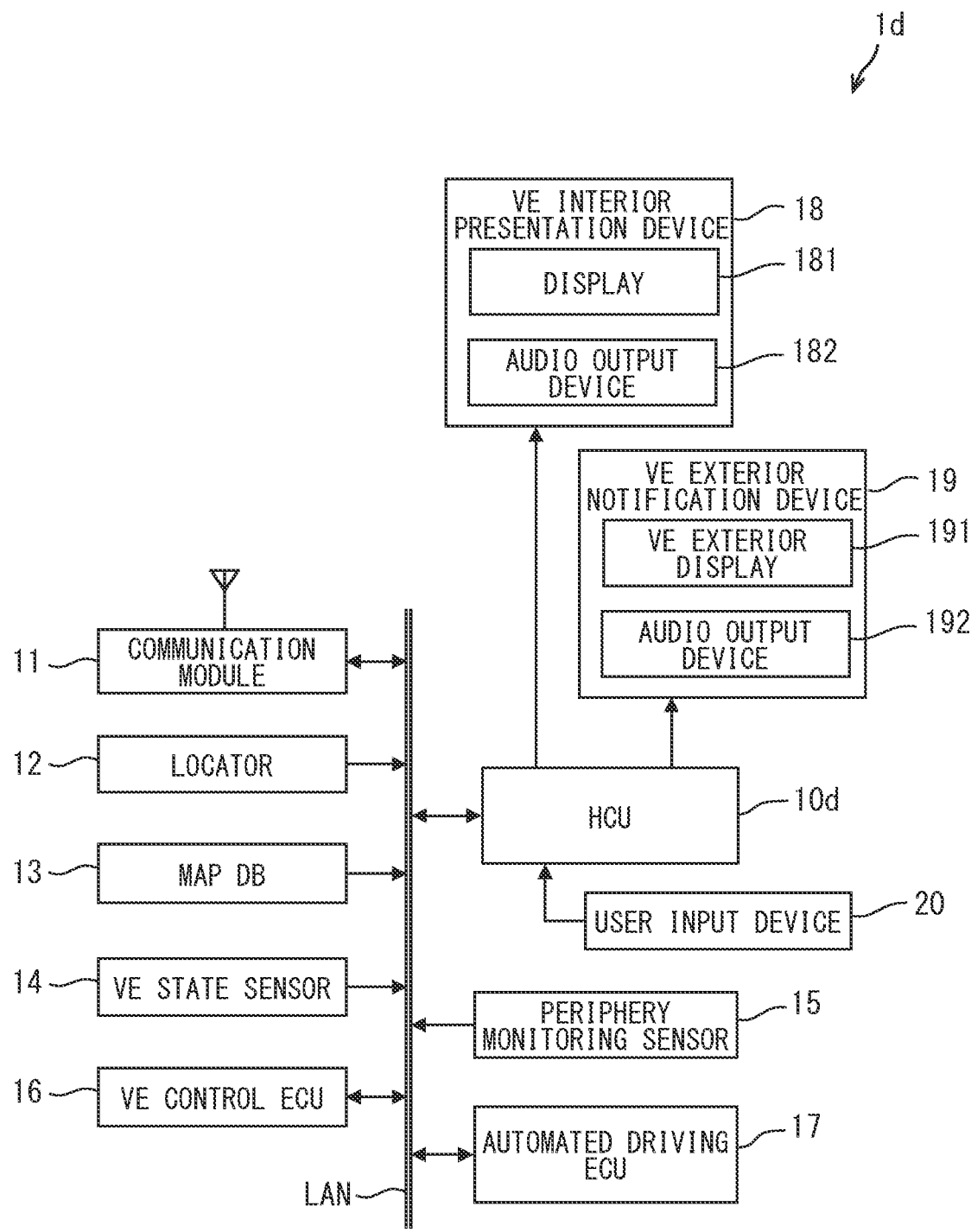
FIG. 23 is a diagram showing an example of a schematic configuration of a vehicle system.

A vehicle system 1*c* shown in FIG. 20 can be used in an automobile. As shown in FIG. 23, the vehicle system 1*d* includes an HCU 10*d*, the communication module 11, the locator 12, the map DB 13, the vehicle state sensor 14, the periphery monitoring sensor 15, the vehicle control ECU 16, the automated driving ECU 17, the vehicle interior presentation device 18, the vehicle exterior notification device 19, and the user input device 20. The vehicle system 1*d* of the second embodiment is similar to the vehicle system 1 of the first embodiment, except that the vehicle system 1*d* includes the HCU 10*d* instead of the HCU 10 and includes the user input device 20. Although the vehicle using the vehicle system 1*d* is not necessarily limited to an automobile, hereinafter, an example using the automobile will be described.

The user input device 20 accepts input from the user. The user input device 20 may be an operation device that receives an operation input from the user. The operation device may be a mechanical switch or a touch switch integrated with the display 181. The user input device 20 is not limited to the operation device that accepts the operation input, as long as the user input device 20 is a device that accepts input from the user. For example, the user input device 20 may be an audio input device that receives command input by an audio such as a voice from the user. This user input device 20 corresponds to a user input unit.

<Schematic Configuration of HCU>

Figure 24:
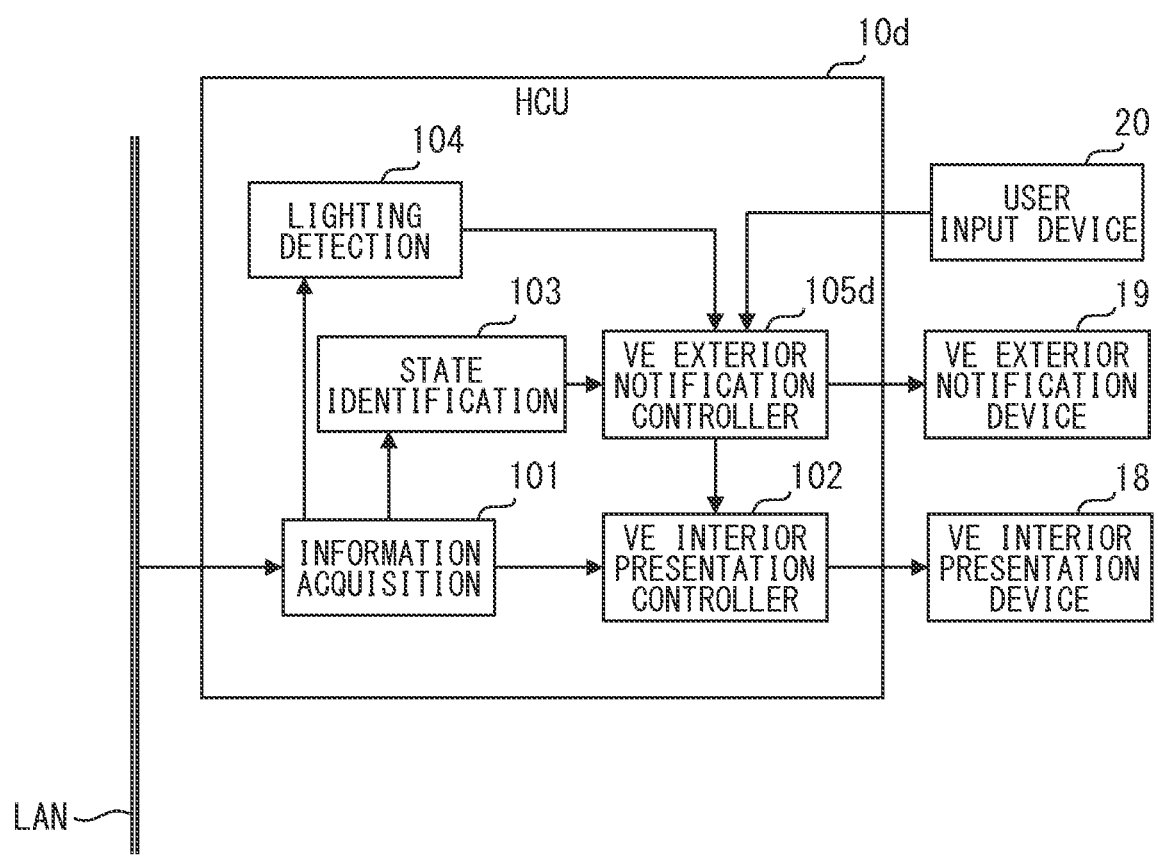
FIG. 24 is a diagram showing an example of a configuration of an HCU.

As shown in FIG. 24, the HCU 10*d* includes the information acquisition unit 101, the vehicle interior presentation controller 102, the state identification unit 103, the lighting detection unit 104, and a vehicle exterior notification controller 105*d* as functional blocks regarding the control of the vehicle interior presentation device 18 and the vehicle exterior notification device 19. The HCU 10*d* is similar to the HCU 10 of the first embodiment except that the HCU 10*d* includes the vehicle exterior notification controller 105*d* instead of the vehicle exterior notification controller 105. This HCU 10*d* also corresponds to the vehicle notification control device. Execution of a process of each functional block of the HCU 10*d* by the computer also corresponds to execution of the vehicle notification control method.

The vehicle exterior notification controller 105*d* is similar to the vehicle exterior notification controller 105 of the first embodiment except that the vehicle exterior notification controller 105*d* can switch the automated driving vehicle exterior notification according to the input from the driver of the subject vehicle, the input being accepted by the user input device 20. According to this, it becomes possible for the driver to use the automated driving vehicle exterior notification for communication with the periphery. An example of switching the automated driving vehicle exterior notification includes an example of switching the automated driving vehicle exterior notification from lighting to blinking in response to the input to the user input device 20. In addition, there is an example of switching from the on-state (lighting) to the off-state in response to the input to the user input device 20. The user input device 20 used for switching the automated driving vehicle exterior notification may be a mechanical switch dedicated to switching the automated driving vehicle exterior notification, for example.

Tenth Embodiment

In the above embodiments, the configuration has been described in which the automated driving vehicle exterior notification can be performed by both the vehicle exterior display 191, 191c and the audio output device 192. However, the present disclosure is not necessarily limited to this configuration. For example, among the automated driving vehicle exterior display 191, 191c and the voice output device 192, only the vehicle exterior display 191, 191c may perform the vehicle exterior notification.

Eleventh Embodiment

In the above embodiments, the configuration has been described in which the automated driving vehicle exterior notification is performed by emitting light from the lamp. However, the present disclosure is not necessarily limited to this configuration except for the fifth embodiment. For example, the automated driving vehicle exterior notification may be made by displaying text or images on the display, display panel or the like instead of emitting light from the lamp.

Twelfth Embodiment

In the above embodiments, the configuration has been described in which the vehicle interior notification can be performed by both the display 181 and the audio output device 182. However, the present disclosure is not necessarily limited to this configuration. For example, among the vehicle exterior display 181 and the audio output device 182, only the display 181 may perform the vehicle interior notification. Alternatively, among the display 181 and the audio output device 182, only the audio output device 182 may perform the vehicle interior notification.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. Further, the controller and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit. Alternatively, the device and the method thereof described in the present disclosure may also be implemented by one or more dedicated computers configured as a combination of a processor executing a computer program and one or more hardware logic circuits. The computer program may be stored in a computer-readable non-transitory tangible recording medium as an instruction to be executed by the computer.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. A vehicle notification control device that is usable for a vehicle capable of performing automated driving, the vehicle notification control device comprising:
   a state identification unit configured to identify an automated driving-related state that is a state of the vehicle, the state being related to the automated driving;
   a vehicle exterior notification controller configured to control a vehicle exterior display that performs, by display, automated driving vehicle exterior notification that is notification of information related to the automated driving toward an outside of the vehicle; and
   a lighting detection unit configured to detect a lighting start of a specific indicator lamp that is installed on the vehicle and performs notification different from the automated driving vehicle exterior notification, and
   wherein
   the vehicle exterior notification controller causes the automated driving vehicle exterior notification during the automated driving of the vehicle based on the automated driving-related state identified by the state identification unit, and changes the display of the automated driving vehicle exterior notification to cause the display to become difficult to be seen based on detection of the lighting start of the specific indicator lamp by the lighting detection unit,
   the lighting detection unit detects, as the lighting start of the specific indicator lamp, at least one lighting start of a brake lamp, a direction indicator, or an emergency blinking indicator lamp of the vehicle,
   the lighting detection unit detects, as the lighting start of the specific indicator lamp, a lighting start of at least the brake lamp and the direction indicator,
   when the lighting detection unit detects the lighting start of the direction indicator during the automated driving of the vehicle, the vehicle exterior notification controller does not perform change causing the display of the automated driving vehicle exterior notification to become difficult to be seen, and
   when the lighting detection unit detects the lighting start of the brake lamp during the automated driving of the vehicle, the vehicle exterior notification controller performs the change causing the display of the automated driving vehicle exterior notification to become difficult to be seen.

2. The vehicle notification control device according to claim 1, wherein
   the vehicle exterior notification controller changes the display of the automated driving vehicle exterior notification so that the display becomes difficult to be seen by turning off the display of the automated driving vehicle exterior notification.

3. The vehicle notification control device according to claim 1, wherein
   the vehicle exterior notification controller changes the display of the automated driving vehicle exterior notification so that the display becomes difficult to be seen by lowering a brightness of the display of the automated driving vehicle exterior notification.

4. The vehicle notification control device according to claim 1, wherein
   the automated driving includes
      area limit automated driving that is performed in a limited area and permits automated driving without a monitoring obligation of a driver of the vehicle and
      traffic congestion limit automated driving that is limitedly performed during a traffic congestion and permits the automated driving without the monitoring obligation of the driver,
   the vehicle notification control device is usable for a vehicle capable of switching the automated driving between the area limit automated driving and the traffic congestion limit automated driving, the lighting detection unit detects the lighting start of at least a brake lamp of the vehicle as the lighting start of the specific indicator lamp, the state identification identifies at least whether the area limit automated driving or the traffic congestion limit automated driving is being performed as the automated driving-related state, the vehicle exterior notification controller does not perform change causing the automated driving vehicle exterior notification to become difficult to be seen, when the lighting detection unit has detected the lighting start of the brake lamp during the traffic congestion limit automated driving based on the automated driving-related state identified by the state identification unit, and the vehicle exterior notification controller perform change causing the display of the automated driving vehicle exterior notification to become difficult to be seen when the lighting detection unit has detected the lighting start of the brake lamp during the area limit automated driving of the vehicle.

5. The vehicle notification control device according to claim 1, wherein the lighting detection unit detects the lighting start of at least a brake lamp of the vehicle as the lighting start of the specific indicator lamp, the vehicle notification control device further includes a vehicle speed identification unit configured to identify a vehicle speed of the vehicle, by using the automated driving-related state identified by the state identification unit, the vehicle exterior notification controller performs change causing the display of the automated driving vehicle exterior notification to become difficult to be seen, when the lighting detection unit has detected the lighting start of the brake lamp during the automated driving of the vehicle and also when the vehicle speed identified by the vehicle speed identification unit is equal to or higher than a predetermined threshold, and the vehicle exterior notification controller does not perform the change causing the display of the automated driving vehicle exterior notification to become difficult to be seen, even when the lighting detection unit has detected the lighting start of the brake lamp and also when the vehicle speed identified by the vehicle speed identification unit is less than the predetermined threshold.

6. The vehicle notification control device according to claim 1, wherein the vehicle exterior display is used together with an indicator lamp that is installed on the vehicle, emits light toward an outside of the vehicle, and is used for a purpose different from the automated driving vehicle exterior notification.

7. The vehicle notification control device according to claim 1, wherein the vehicle exterior display is used together with an indicator lamp that is installed on the vehicle, emits light toward an outside of the vehicle, and is used for the notification that is performed by the specific indicator lamp and is different from the automated driving.

8. The vehicle notification control device according to claim 1, wherein the vehicle exterior display is installed on a rear portion of the vehicle and at least one of a front portion or a side portion of the vehicle, the front portion and the side portion are a non-rear portion, the lighting detection unit detects the lighting start of at least a brake lamp of the vehicle as the lighting start of the specific indicator lamp, the vehicle exterior notification controller performs change causing a display of the automated driving vehicle exterior notification of the vehicle exterior display installed on the rear portion to become difficult to be seen, based on detection of a lighting start of the brake lamp by the lighting detection unit, and when the lighting detection unit has detected the lighting start of the brake lamp, the vehicle exterior notification controller causes the vehicle exterior display provided on the non-rear portion to display the automated driving vehicle exterior notification without performing the change causing the display to become difficult to be seen.

9. A vehicle notification control device that is usable for a vehicle capable of performing automated driving, the vehicle notification control device comprising:

a state identification unit configured to identify an automated driving-related state that is a state of the vehicle, the state being related to the automated driving; and a vehicle exterior notification controller configured to control a vehicle exterior display that performs, by display, automated driving vehicle exterior notification that is notification of information related to the automated driving toward an outside of the vehicle, wherein the vehicle exterior display is placed separately from a specific indicator lamp that is installed on the vehicle and performs notification different from the automated driving vehicle exterior notification, the vehicle exterior notification controller uses the automated driving-related state identified by the state identification unit to cause the automated driving vehicle exterior notification during the automated driving of the vehicle, a brightness of the caused vehicle exterior notification is lower than a brightness of lighting of the specific indicator lamp, the vehicle notification control device further includes a vehicle interior notification controller configured to control a vehicle interior notification device configured to perform vehicle interior notification that is notification indicating that the automated driving vehicle exterior notification has been performed toward an inside of the vehicle, the vehicle interior notification device is configured to display an image showing the vehicle, the vehicle interior notification controller is configured to cause the vehicle interior notification device to perform the vehicle interior notification by vehicle interior notification display in an automated driving vehicle exterior notification area in an image that is displayed by the vehicle interior notification device and indicates the vehicle, and the vehicle interior notification is similar to a display of the automated driving vehicle exterior notification.

10. The vehicle notification control device according to claim 9, wherein the vehicle exterior display is configured to perform the automated driving vehicle exterior notification by light emission.

11. The vehicle notification control device according to claim 9, wherein the vehicle exterior display is provided at a position where a license plate of the vehicle is provided.

12. The vehicle notification control device according to claim 9, wherein
the vehicle exterior display is provided at a position in contact with at least one of a brake lamp or a direction indicator of the vehicle.

13. The vehicle notification control device according to claim 9, wherein
the vehicle exterior display is placed at a position along a lateral axis of the vehicle or a vertical axis of the vehicle,
the lateral axis passes through at least one of the brake lamp or a direction indicator of at least one of a front surface or a rear surface of the vehicle, and
the vertical axis passes through at least the brake lamp or the direction indicator.

14. The vehicle notification control device according to claim 9, wherein
the vehicle exterior notification controller is configured to switch the automated driving vehicle exterior notification according to an input received by an user input device that receives the input from a driver of the vehicle.

15. A vehicle notification control method that is usable for a vehicle capable of performing automated driving, the vehicle notification control method comprising causing at least one processor to:
identify an automated driving-related state that is a state of the vehicle, the state being related to the automated driving;
control a vehicle exterior display that performs, by display, automated driving vehicle exterior notification that is notification of information related to the automated driving toward an outside of the vehicle;
detect a lighting start of a specific indicator lamp that is installed on the vehicle and performs notification different from the automated driving vehicle exterior notification;
cause the automated driving vehicle exterior notification during the automated driving of the vehicle based on the identified automated driving-related state; and
change the display of the automated driving vehicle exterior notification to cause the display to become difficult to be seen based on detection of the lighting start of the specific indicator lamp, wherein
the processor detects, as the lighting start of the specific indicator lamp, at least one lighting start of a brake lamp, a direction indicator, or an emergency blinking indicator lamp of the vehicle,
the processor detects, as the lighting start of the specific indicator lamp, a lighting start of at least the brake lamp and the direction indicator,
when the processor detects the lighting start of the direction indicator during the automated driving of the vehicle, the processor does not perform change causing the display of the automated driving vehicle exterior notification to become difficult to be seen, and when the processor detects the lighting start of the brake lamp during the automated driving of the vehicle, the processor performs the change causing the display of the automated driving vehicle exterior notification to become difficult to be seen.

16. A vehicle notification control method that is usable for a vehicle capable of performing automated driving, the vehicle notification control method comprising causing at least one processor to:
identify an automated driving-related state that is a state of the vehicle, the state being related to the automated driving; and
control a vehicle exterior display that performs, by display, automated driving vehicle exterior notification that is notification of information related to the automated driving toward an outside of the vehicle,
wherein
the vehicle exterior display is placed separately from a specific indicator lamp that is installed on the vehicle and performs notification different from the automated driving vehicle exterior notification,
the processor is further caused to use the identified automated driving-related state to cause the automated driving vehicle exterior notification during the automated driving of the vehicle,
a brightness of the caused vehicle exterior notification is lower than a brightness at a lighting time of the specific indicator lamp,
the processor is configured to perform vehicle interior notification that is notification indicating that the automated driving vehicle exterior notification has been performed toward an inside of the vehicle,
the processor is configured to display an image showing the vehicle,
the processor is configured to perform the vehicle interior notification by vehicle interior notification display in an automated driving vehicle exterior notification area in an image that is displayed and indicates the vehicle, and
the vehicle interior notification is similar to a display of the automated driving vehicle exterior notification.

17. The vehicle notification control device according to claim 1, further comprising:
a processor that serves as the state identification unit, the vehicle exterior notification controller, and the lighting detection unit.

18. The vehicle notification control device according to claim 5, further comprising:
a processor that serves as the vehicle speed identification unit.

19. The vehicle notification control device according to claim 9, further comprising:
a processor that serves as the state identification unit and the vehicle exterior notification controller.

20. The vehicle notification control device according to claim 9, further comprising:
a processor that serves as the vehicle interior notification controller.

* * * * *